· US011287978B2

(12) United States Patent
Yoon

(10) Patent No.: US 11,287,978 B2
(45) Date of Patent: Mar. 29, 2022

(54) DATA STORAGE DEVICES, HAVING SCALE-OUT DEVICES TO MAP AND CONTROL GROUPS ON NON-VOLATILE MEMORY DEVICES

(71) Applicant: Samsung Electronics Co., Ltd., Suwon-si (KR)

(72) Inventor: Chan Ho Yoon, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 72 days.

(21) Appl. No.: 16/658,823

(22) Filed: Oct. 21, 2019

(65) Prior Publication Data

US 2020/0050374 A1 Feb. 13, 2020

Related U.S. Application Data

(63) Continuation of application No. 15/069,568, filed on Mar. 14, 2016, now Pat. No. 10,452,269.

(30) Foreign Application Priority Data

Mar. 16, 2015 (KR) .................. 10-2015-0035868

(51) Int. Cl.
*G06F 12/02* (2006.01)
*G06F 3/06* (2006.01)
*G06F 12/10* (2016.01)

(52) U.S. Cl.
CPC ............ *G06F 3/0605* (2013.01); *G06F 3/064* (2013.01); *G06F 3/0688* (2013.01); *G06F 12/0246* (2013.01); *G06F 12/10* (2013.01); *G06F 2212/261* (2013.01); *G06F 2212/7201* (2013.01); *G06F 2212/7208* (2013.01)

(58) Field of Classification Search
CPC . G06F 3/0688; G06F 12/046; G06F 2212/261
USPC ....................................................... 711/103
See application file for complete search history.

(56) References Cited

U.S. PATENT DOCUMENTS

| 7,679,133 | B2 | 3/2010 | Son et al. |
|---|---|---|---|
| 7,688,621 | B2 | 3/2010 | Cho et al. |
| 7,743,292 | B2 | 6/2010 | Jing et al. |
| 7,958,280 | B2 | 6/2011 | Salessi et al. |
| 8,037,234 | B2 | 10/2011 | Yu et al. |
| 8,176,238 | B2 | 5/2012 | Yu et al. |
| 8,266,367 | B2 | 9/2012 | Yu et al. |
| 8,341,332 | B2 | 12/2012 | Ma et al. |
| 8,433,695 | B2 | 4/2013 | Wu et al. |
| 8,489,937 | B2 | 7/2013 | Okada et al. |
| 8,553,466 | B2 | 10/2013 | Han et al. |
| 8,559,235 | B2 | 10/2013 | Yoon et al. |

(Continued)

*Primary Examiner* — Than Nguyen
(74) *Attorney, Agent, or Firm* — Harness, Dickey & Pierce, P.L.C.

(57) ABSTRACT

A scale-out device to control a group of non-volatile memory devices from among a plurality of non-volatile memory devices at a data storage device, includes a buffer and a scale-out controller. The buffer is configured to store address mapping information for the group of non-volatile memory devices, the group of non-volatile memory devices being a portion of the plurality of non-volatile memory devices at the data storage device. The scale-out controller is configured to control operation of only the group of non-volatile memory devices according to the address mapping information stored at the buffer.

14 Claims, 15 Drawing Sheets

(56) References Cited

U.S. PATENT DOCUMENTS

| | | |
|---|---|---|
| 8,566,511 B2 | 10/2013 | Tootoonchian et al. |
| 8,654,587 B2 | 2/2014 | Yoon et al. |
| 8,725,957 B2 | 5/2014 | Eleftheriou et al. |
| 8,762,789 B2 | 6/2014 | Lund et al. |
| 8,806,165 B2 | 8/2014 | Selfin et al. |
| 8,954,654 B2 | 2/2015 | Yu et al. |
| 8,959,217 B2 | 2/2015 | Mayo et al. |
| 2009/0193184 A1 | 7/2009 | Yu et al. |
| 2009/0228637 A1 | 9/2009 | Moon et al. |
| 2010/0115225 A1 | 5/2010 | Kim et al. |
| 2010/0157478 A1 | 6/2010 | Changstrom et al. |
| 2011/0233648 A1 | 9/2011 | Seol et al. |
| 2011/0302365 A1 | 12/2011 | Heo et al. |
| 2013/0073822 A1 | 3/2013 | Sandel et al. |
| 2013/0166825 A1* | 6/2013 | Kim ................ G06F 12/0246 711/103 |
| 2013/0185485 A1 | 7/2013 | Kim et al. |
| 2013/0198439 A1 | 8/2013 | Kurotsuchi et al. |
| 2013/0332614 A1 | 12/2013 | Brunk et al. |
| 2014/0095827 A1 | 4/2014 | Wei et al. |
| 2014/0101370 A1 | 4/2014 | Chu et al. |
| 2014/0136769 A1 | 5/2014 | Franceschini et al. |
| 2014/0195720 A1 | 7/2014 | Akella et al. |
| 2014/0258596 A1* | 9/2014 | Kojima ............... G06F 12/0246 711/103 |
| 2014/0258755 A1 | 9/2014 | Stenfort |
| 2014/0372685 A1* | 12/2014 | Jeong ................. G06F 12/0246 711/103 |
| 2015/0149706 A1 | 5/2015 | Salessi et al. |
| 2015/0301748 A1 | 10/2015 | Lee |
| 2015/0347296 A1 | 12/2015 | Kotte et al. |
| 2016/0019160 A1* | 1/2016 | Mohan ............... G06F 12/0246 711/208 |
| 2016/0062663 A1 | 3/2016 | Samuels et al. |
| 2016/0117252 A1 | 4/2016 | Thangaraj et al. |
| 2016/0117256 A1 | 4/2016 | Dor et al. |
| 2016/0139813 A1 | 5/2016 | Chen et al. |
| 2016/0147651 A1 | 5/2016 | Desai et al. |
| 2017/0017428 A1 | 1/2017 | Salessi et al. |
| 2017/0046273 A1 | 2/2017 | Cohen |

\* cited by examiner

FIG. 12A

TABLE1

| Logical Address | Scale-Out Controller ID |
|---|---|
| LBA0 ~ LBA999 | Scale-Out Controller#1 |
| LBA1000 ~ LBA1999 | Scale-Out Controller#2 |
| LBA2000 ~ LBA2999 | Scale-Out Controller#3 |
| LBA3000 ~ LBA3999 | Scale-Out Controller#4 |
| ⋮ | ⋮ |

FIG. 12B

TABLE2

| Logical Address | Physical Address |
|---|---|
| LBA0 ~ LBA199 | PPN0 ~ PPN199 |
| LBA200 ~ LBA399 | PPN200 ~ PPN399 |
| LBA400 ~ LBA599 | PPN400 ~ PPN599 |
| LBA600 ~ LBA799 | PPN600 ~ PPN799 |
| LBA800 ~ LBA999 | PPN800 ~ PPN999 |

DATA STORAGE DEVICES, HAVING SCALE-OUT DEVICES TO MAP AND CONTROL GROUPS ON NON-VOLATILE MEMORY DEVICES

CROSS-REFERENCE TO RELATED APPLICATION(S)

This application is a continuation of U.S. patent application Ser. No. 15/069,568, filed on Mar. 14, 2016, which claims priority under 35 U.S.C. § 119(a) to Korean Patent Application No. 10-2015-0035868 filed on Mar. 16, 2015, the entire contents of each of which is hereby incorporated by reference in its entirety.

BACKGROUND

Field

At least some example embodiments of inventive concepts relate to data storage devices (e.g., data storage devices having a distributed scale-out structure), data processing systems having the same, methods of operating, and methods of manufacturing the same.

Description of the Conventional Art

A memory device is used to store data. Conventionally, memory devices are classified as volatile memory devices and non-volatile memory devices. A flash memory device is an example of an electrically erasable programmable read-only memory (EEPROM) in which a plurality of memory cells are erased or programmed by a one-time program operation. For a conventional drive (or storage device) including non-volatile memory devices (e.g., flash memory devices), as the number of non-volatile memory devices increases so does the storage capacity of the drive.

When the number of non-volatile memory devices included in the drive is increased, a size of a mapping table including information for converting logical addresses into physical addresses also increases. This increase in information may limit increases in memory storage capacity of conventional drives.

Examples of conventional methods for increasing data processing capabilities of data storage devices, (e.g., data servers) include scale up and scale out techniques. A scale up structure (also referred to as vertical scaling) increases the data processing capability of a data server by increasing a capacity of the data server itself. A scale out structure (also referred to as horizontal scaling) increases the data processing capability of a system including the data server by increasing the number of connected data servers.

In a conventional data storage device having a scale up structure, when the number of non-volatile memory devices included in the data storage device is increased, a loading capacitance of an interface between non-volatile memory devices and a controller controlling the non-volatile memory devices also increases. Accordingly, a data processing speed of the data storage device may decrease.

SUMMARY

At least some example embodiments of inventive concepts relate to data storage devices (e.g., data storage devices having a distributed scale-out structure), data processing systems having the same, methods of operating, and methods of manufacturing the same At least one example embodiment provides a scale-out device for controlling a group of non-volatile memory devices from among a plurality of non-volatile memory devices at a data storage device. The scale-out device includes: a buffer configured to store address mapping information for the group of non-volatile memory devices, the group of non-volatile memory devices being a portion of the plurality of non-volatile memory devices at the data storage device; and a scale-out controller configured to control operation of only the group of non-volatile memory devices according to the address mapping information stored at the buffer.

The address mapping information may be logical-to-physical address mapping information for the group of non-volatile memory devices. The buffer may be configured to store address mapping information for only the group of non-volatile memory devices from among the plurality of non-volatile memory devices.

The scale-out controller may be configured to control operation of the group of non-volatile memory devices independently of other non-volatile memory devices among the plurality of non-volatile memory devices at the data storage device.

The buffer and the scale-out controller may be in the form of a multi-chip package (MCP).

The scale-out controller may be coupled to the group of non-volatile memory devices through at least a first channel.

The scale-out controller may be connected to a first set of non-volatile memory devices, from among the group of non-volatile memory devices, via the first channel; and the scale-out controller may be connected to a second set of non-volatile memory devices, from among the group of non-volatile memory devices, via a second channel.

At least one other example embodiment provides a memory module. The memory module includes: a first scale-out device coupled, via at least one first channel, to a first group of non-volatile memory devices from among a plurality of non-volatile memory devices. The first scale-out device is configured to: store a first set of address mapping information for the first group of non-volatile memory devices; and control operation of only non-volatile memory devices in the first group of non-volatile memory devices according to the stored first set of address mapping information.

According to at least some example embodiments, the memory module may further include the first group of non-volatile memory devices.

The first set of address mapping information may be logical-to-physical address mapping information for the first group of non-volatile memory devices. The first scale-out device may be configured to store address mapping information for only the first group of non-volatile memory devices.

The first scale-out device may be in the form of a multi-chip package (MCP).

The first group of non-volatile memory devices may include a plurality of first sets of non-volatile memory devices, wherein each first set of non-volatile memory is coupled to the first scale-out device via a corresponding one of a plurality of first channels.

The memory module may further include: a second group of non-volatile memory devices; and a second scale-out device coupled to the second group of non-volatile memory devices via at least one second channel. The second scale-out device may be configured to: store a second set of address mapping information for the second group of non-volatile memory devices; and control operation of only the second group of non-volatile memory devices according to the stored second set of address mapping information.

The first group of non-volatile memory devices may include a plurality of first sets of non-volatile memory devices, wherein each first set of non-volatile memory devices is coupled to the first scale-out device via a corresponding one of a plurality of first channels. The second group of non-volatile memory devices may include a plurality of second sets of non-volatile memory devices, wherein each second set of non-volatile memory devices is coupled to the second scale-out device via a corresponding one of a plurality of second channels.

The memory module may further include a second scale-out device coupled, via at least one second channel, to a second group of non-volatile memory devices from among the plurality of non-volatile memory devices. The second scale-out device may be configured to: store a second set of address mapping information for the second group of non-volatile memory devices; and control operation of only the second group of non-volatile memory devices according to the stored second set of address mapping information.

The first set of address mapping information may be logical-to-physical address mapping information for the first group of non-volatile memory devices; and the second set of address mapping information may be logical-to-physical address mapping information for the second group of non-volatile memory devices.

The first scale-out device may be configured to store address mapping information for only the first group of non-volatile memory devices. The second scale-out device may be configured to store address mapping information for only the second group of non-volatile memory devices.

The first scale-out device and the second scale-out device may each be in the form of a multi-chip package (MCP).

At least one other example embodiment provides a data storage device. The data storage device includes: a memory module including at least a first memory cluster and a first scale-out device, the first memory cluster including at least a first plurality of non-volatile memories, and the first scale-out device having a first local flash translation layer, the first local flash translation layer being configured to associate a first set of logical addresses for the data storage device with a first set of physical addresses, the first set of physical addresses including physical addresses for only the first plurality of non-volatile memories; and a memory controller having a global flash translation layer configured to associate the first set of logical addresses with the first scale-out device.

According to at least some example embodiments, the data storage device may be a Universal Flash Storage (UFS) device.

The first scale-out device may include: a buffer configured to store address mapping information for the first set of logical addresses and the first set of physical addresses; and a scale-out controller configured to control operation of only the first plurality of non-volatile memories according to the address mapping information stored at the buffer.

The global flash translation layer may be configured to associate the first set of logical addresses with the scale-out controller in a table stored at the memory controller.

The first plurality of non-volatile memories may include a first plurality of groups of non-volatile memory devices, wherein each group of non-volatile memory devices in the first plurality of groups of non-volatile memory devices is coupled to the first scale-out device via a corresponding one of a plurality of first channels.

The memory module may further include: a second memory cluster including a second plurality of non-volatile memories; and a second scale-out device having a second local flash translation layer configured to associate a second set of logical addresses for the data storage device with a second set of physical addresses, the second set of physical addresses including physical addresses for only the second plurality of non-volatile memories. The global flash translation layer may be configured to associate the second set of logical addresses with the second scale-out device.

The first plurality of non-volatile memories may include a first plurality of groups of non-volatile memory devices, wherein each group of non-volatile memory devices in the first plurality of groups of non-volatile memory devices is coupled to the first scale-out device via a corresponding one of a plurality of first channels. The second plurality of non-volatile memories may include a second plurality of groups of non-volatile memory devices, wherein each group of non-volatile memory devices in the second plurality of groups of non-volatile memory devices is coupled to the second scale-out device via a corresponding one of a plurality of second channels.

At least one other example embodiment provides a data storage system. The data storage system includes a plurality of data storage devices. At least one of the plurality of data storage devices includes: a memory module including at least a first memory cluster and a first scale-out device, the first memory cluster including at least a first plurality of non-volatile memories, and the first scale-out device having a first local flash translation layer, the first local flash translation layer being configured to associate a first set of logical addresses for the data storage device with a first set of physical addresses, the first set of physical addresses including physical addresses for only the first plurality of non-volatile memories; and a memory controller having a global flash translation layer configured to associate the first set of logical addresses with the first scale-out device.

According to at least some example embodiments, the data storage device may be a Universal Flash Storage (UFS) device.

The first scale-out device may include: a buffer configured to store address mapping information for the first set of logical addresses and the first set of physical addresses; and a scale-out controller configured to control operation of only the first plurality of non-volatile memories according to the address mapping information stored at the buffer.

The global flash translation layer may be configured to associate the first set of logical addresses with the first scale-out controller in a table stored at the memory controller.

The first plurality of non-volatile memories may include at least a first plurality of groups of non-volatile memory devices, wherein each group of non-volatile memory devices in the first plurality of groups of non-volatile memory devices is coupled to the first scale-out device via a corresponding one of a plurality of first channels.

The memory module may further include: a second memory cluster including a second plurality of non-volatile memories; and a second scale-out device having a second local flash translation layer, the second local flash translation layer being configured to associate a second set of logical addresses for the data storage device with a second set of physical addresses, the second set of physical addresses including physical addresses for only the second plurality of non-volatile memories. The global flash translation layer may be configured to associate the second set of logical addresses with the second scale-out device.

The first plurality of non-volatile memories may include a first plurality of groups of non-volatile memory devices, wherein each group of non-volatile memory devices in the first plurality of groups of non-volatile memory devices being coupled to the first scale-out device via a corresponding one of a plurality of first channels. The second plurality of non-volatile memories may include a second plurality of groups of non-volatile memory devices, wherein each group of non-volatile memory devices in the second plurality of groups of non-volatile memory devices being coupled to the second scale-out device via a corresponding one of a plurality of second channels.

BRIEF DESCRIPTION OF THE DRAWINGS

Example embodiments of inventive concepts will become more apparent and readily appreciated from the following description of the drawings in which:

FIGS. 12A to 12B illustrate example logical address-to-physical address mapping tables according to example embodiments of inventive concepts;

DETAILED DESCRIPTION

Figure 1:
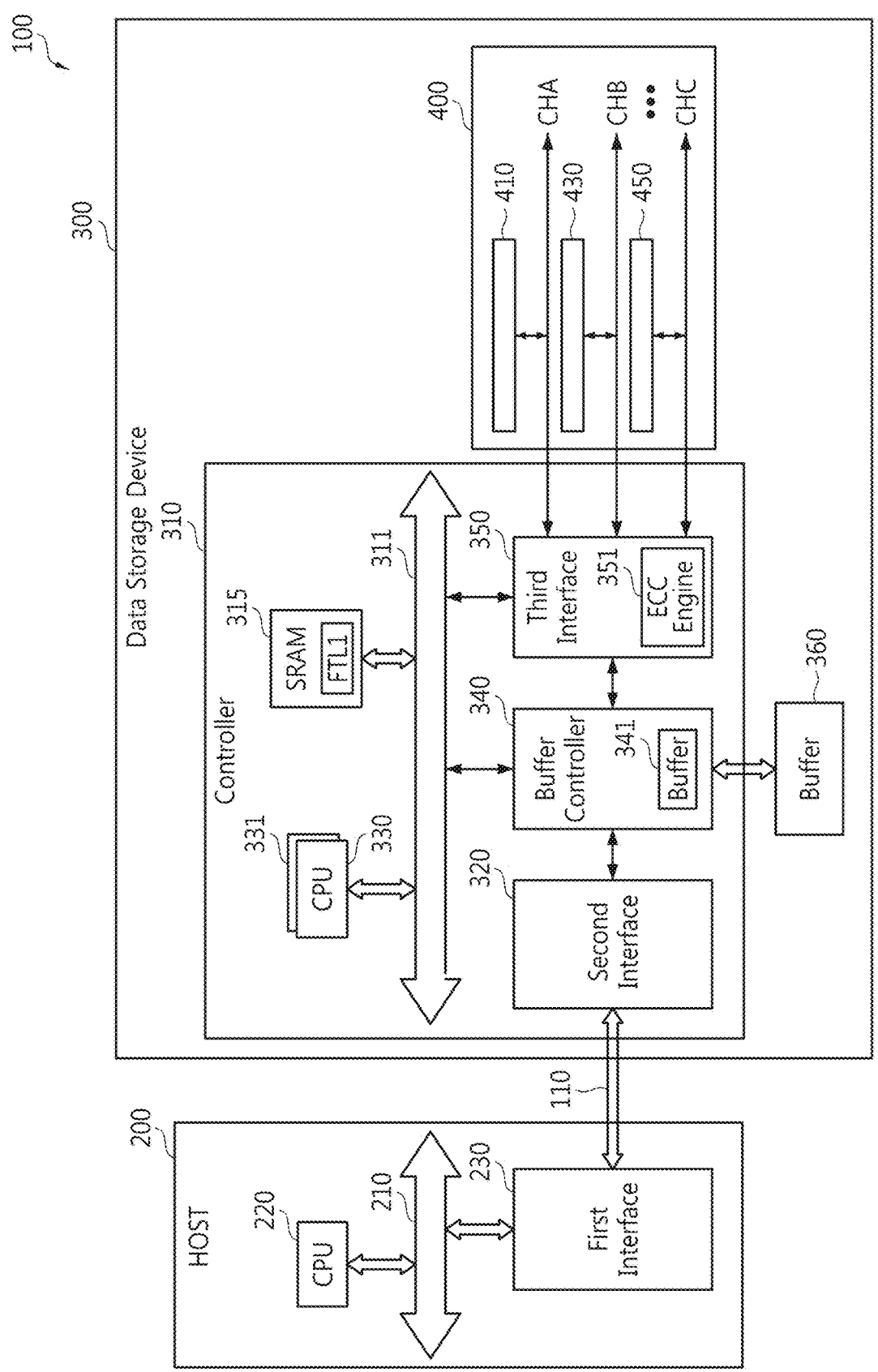
FIG. 1 is a block diagram of a data processing system according to an example embodiment of inventive concepts.

As used herein, the term "and/or" includes any and all combinations of one or more of the associated listed items. Expressions such as "at least one of," when preceding a list of elements, modify the entire list of elements and do not modify the individual elements of the list.

Hereinafter, inventive concepts will be described more fully with reference to the accompanying drawings, in which some example embodiments are shown. In the drawings, like elements are labeled like reference numerals and repeated description thereof will be omitted. Inventive concepts may, however, be embodied in many different forms and should not be construed as limited to the example embodiments set forth herein. Rather, example embodiments are provided so that this disclosure will be thorough and complete, and will fully convey the scope of inventive concepts to those of ordinary skill in the art.

In the present description, terms such as 'first', 'second', etc. are used to describe various members, areas, layers, regions, and/or components. However, it is obvious that the members, areas, layers, regions, and/or components should not be defined by these terms. The terms should not be construed as indicating any particular order, the upper or lower position, or superiority or inferiority, and are used only for distinguishing one member, area, layer, region, or component from another member, area, layer, region, or component. Thus, a first member, area, layer, region, or component which will be described may also refer to a second member, area, layer, region, or component, without departing from the teaching of inventive concepts. For example, without departing from the scope of inventive concepts, a first component may be referred to as a second component, and similarly, a second component may be referred to as a first component.

Unless expressly described otherwise, all terms including descriptive or technical terms which are used herein should be construed as having meanings that are obvious to one of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

When an embodiment is implementable in another manner, a given (or alternatively, desired or predetermined) process order may be different from the one described. For example, two processes that are consecutively described may be substantially simultaneously or concurrently performed, or may be performed in an order opposite to the described order.

In the drawings, for example, according to the manufacturing techniques and/or tolerances, shapes of the illustrated elements may be modified. Thus, inventive concepts should not be construed as being limited to the example embodiments set forth herein, and should include, for example, variations in the shapes caused during manufacturing.

Specific details are provided in the following description to provide a thorough understanding of inventive concepts. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types. The operations may be implemented using existing hardware in existing memory devices or systems. Such existing hardware may include one or more Central Processing Units (CPUs), digital signal processors (DSPs), application-specific-integrated-circuits (ASICs), system-on-chips (SoCs), field programmable gate arrays (FPGAs), computers, or the like.

Further, one or more example embodiments may be (or include) hardware, firmware, hardware executing software, or any combination thereof. Such hardware may include one or more CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although a flow chart may describe operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Reference will now be made in detail to the example embodiments illustrated in the accompanying drawings, wherein like reference numerals refer to like elements throughout.

FIG. 1 is a block diagram of a data processing system 100 according to an example embodiment of inventive concepts.

Referring to FIG. 1, the data processing system 100 includes a host 200 and a data storage device 300. The host 200 and the data storage device 300 may exchange data through an interface 110. For example, the data storage device 300 may transmit and/or receive commands and/or data to or from the host 200 through the interface 110. According to at least some example embodiments, the data storage device 300 may have a scale-out structure.

According to at least some example embodiments, the data processing system 100 may be a data processing system. The data processing system may be used in a personal computer (PC), a workstation, a data center, an Internet data center, an enterprise data storage system, a storage area network (SAN), a network attached storage (NAS), etc. However, the data processing system 100 should not be limited to these examples.

The interface 110 may be embodied as a serial advanced technology attachment (SATA) interface, a SATA express (SATAe) interface, a serial attached small computer system interface (SCSI), a peripheral component interconnect express (PCIe) interface, a non-volatile memory Express (NVMe) interface, an advanced host controller interface (AHCI), a combination of these, or the like. However, the interface 110 should not be limited to these examples. According to at least some example embodiments, the interface 110 may transmit electrical signals or optical signals.

The host 200 may control data processing operations (e.g., write operations, program operations or erase operations) for the data storage device 300 through the interface 110.

The host 200 includes: a central processing unit (CPU) 220; a first interface 230; and a bus architecture (or bus) 210. The CPU 220 and the first interface 230 are connected via the bus architecture 210. The CPU 220 and the first interface 230 may transmit and/or receive commands and/or data to and/or from each other through the bus architecture 210. The block diagram of the host 200 shown in FIG. 1 is only an example, and example embodiments should not be limited to this example. According to at least some example embodiments, the host 200 may be embodied as an integrated circuit (IC), a motherboard, a SoC, an application processor (AP), a mobile AP, a database server, etc. However, the host 200 should not be limited to these examples.

According to at least some example embodiments, the bus architecture 210 may be embodied as an advanced microcontroller bus architecture (AMBA), an advanced high-performance bus (AHB), an advanced peripheral bus (APB), an advanced eXtensible interface (AXI), an advanced system bus (ASB), a combination of these, or the like. However, the bus architecture 210 should not be limited to these examples.

The CPU 220 may generate write requests to control write operations of the data storage device 300. The CPU 220 may also generate read requests to control read operations of the data storage device 300. However, requests should not be limited to these examples. According to at least some example embodiments, the write requests may include write addresses, and the read requests may include read addresses. The CPU 220 may include one or more cores (e.g., 2, 4, 6, 8, etc.).

Still referring to FIG. 1, the first interface 230 may change a format of a command and/or data to be transmitted to the data storage device 300, and transmit the command and/or data having the changed format to the data storage device 300 through the interface 110. Moreover, the first interface 230 may change a format of a response and/or data transmitted from the data storage device 300, and transmit the response and/or data having the changed format to the CPU 220 through the bus architecture 210. According to at least some example embodiments, the first interface 230 may include a transceiver to transmit and/or receive commands and/or data. A structure and operation of the first interface 230 may be embodied to be compatible with and/or suitable for the structure and operation of the interface 110.

The data storage device 300 includes: a controller 310; an external buffer 360; and a memory cluster (or memory device sets) 400. The data storage device 300 may be embodied as a flash memory-based memory device; however, the data storage device 300 should not be limited to this example. For example, the data storage device 300 may be embodied as a solid-state drive or solid-state disk (SSD), an embedded SSD (eSSD), a universal flash storage (UFS), a multimedia card (MMC), an embedded MMC (eMMC), etc. However, the data storage device 300 should also not be limited to these examples. The flash memory-based memory device may be embodied in a NAND-type flash memory device or a NOR-type flash memory device.

According to at least some other example embodiments, the data storage device 300 may be embodied as a hard disk drive (HDD), a phase change random access memory (PRAM) device, a magnetoresistive RAM (MRAM) device, a spin-transfer torque MRAM (STT-MRAM) device, a ferroelectric RAM (FRAM) device, a resistive RAM (RRAM) device, etc. However, example embodiments should also not be limited to these examples.

The controller 310 may control commands and/or data transmitted and/or received among the host 200, the external buffer 360, and the memory cluster 400. According to at least some example embodiments, the controller 310 may be embodied in an integrated circuit (IC), SoC, or a package.

In the example embodiment shown in FIG. 1, the controller 310 includes: a bus architecture (or bus) 311; an internal memory 315; a second interface 320; at least one CPU 330 and/or 331; a buffer controller 340; and a third interface 350. The controller 310 further includes an internal buffer 341 controlled by the buffer controller 340. Although the internal buffer 341 is embodied in the buffer controller 340 in the example embodiment shown in FIG. 1, the internal buffer 341 may be embodied as part of the controller 310 rather than the buffer controller 340. The bus architecture 311 may be embodied as an AMBA, an AHB, an APB, an AXI, an ASB, a combination thereof, or the like. However, example embodiments should not be limited to these examples.

The internal memory 315 may store data necessary for operation of the controller 310 and/or data generated by a data processing operation (e.g., a write operation and/or a read operation) performed by the controller 310. In one example, the internal memory 315 may store a first flash translation layer code (FTL1), which may be executed by the CPU 330 and/or 331. The first FTL code (FTL1) may be loaded to the internal memory 315 from the memory cluster 400 when booting.

According to at least some example embodiments, the internal memory 315 may be embodied as a random access memory (RAM), a dynamic RAM (DRAM), a static RAM (SRAM), a buffer, a buffer memory, a cache, a tightly coupled memory (TCM), etc. However, example embodiments should not be limited to these examples.

The second interface 320 may change a format of responses and/or data to be transmitted to the host 200, and transmit the changed responses and/or data to the host 200 through the interface 110. Moreover, the second interface 320 may receive commands and/or data transmitted from the host 200, change a format of the received commands and/or data, and transmit the changed commands and/or data to the CPU 330 and/or 331 and/or to the buffer controller 340. According to at least some example embodiments, the second interface 320 may include a transceiver to transmit and/or receive signals and/or data.

The structure and operation of the second interface 320 may be embodied to be compatible with and/or suitable for a structure and an operation of the interface 110. For example, the second interface 320 may be embodied as a SATA interface, a SATAe interface, a SAS, a PCIe interface, a NVMe interface, an AHCI, a NAND-type flash memory interface, a NOR-type flash memory interface, etc. However, example embodiments should not be limited to these examples.

The CPUs 330 and/or 331 may control the internal memory 315, the second interface 320, the buffer controller 340, and the third interface 350 through the bus architecture 311. Each of the CPUs 330 and 331 may include one or more cores. In at least one example, a first of the CPUs 330 may control an interaction with the host 200 through the second interface 320, and a second of the CPUs 331 may control an interaction with a memory cluster 400 through the third interface 350. According to at least some example embodiments, the first CPU 330 and the second CPU 331 may compose a multi-CPU. According to at least some example embodiments, the first CPU 330 may control the second CPU 331. However, example embodiments should not be limited to this example.

The buffer controller 340 may write data to the external buffer 360 and/or read data stored in the external buffer 360 according to a control of the first CPU 330 and/or the second CPU 331. The buffer controller 340 may be referred to as a controller or a buffer manager, which controls write and/or read operations of the external buffer 360. The internal buffer 341 may be embodied as a volatile memory such as a SRAM.

For example, after data transmitted from the host 200 is temporarily stored in the external buffer 360 through the buffer controller 340 during a write operation, data output from the external buffer 360 may be written to the memory cluster 400 through the buffer controller 340 and the third interface 350. During a read operation, data may be transmitted from the memory cluster 400 to the host 200 through the third interface 350 and the internal buffer 341.

The third interface 350 may control data processing operations (e.g., write or program operations and/or read operations) for the memory cluster 400 through a corresponding main channel among a plurality of main channels CHA, CHB, . . . , CHC according to a control of the first CPU 330 and/or the second CPU 331. According to at least some example embodiments, the third interface 350 may be embodied as a SATA interface, a SATAe interface, a SAS, a PCIe interface, an NVMe interface, an AHCI, a NAND-type flash memory interface, a NAND manager, a NOR-type flash memory interface, etc. However, example embodiments should not be limited to these examples.

Still referring to FIG. 1, the third interface 350 includes an error correction code (ECC) engine 351. The ECC engine 351 may correct errors included in data to be stored in and/or output from the memory cluster 400. Although the ECC engine 351 is shown as part of the third interface 350 in the example embodiment shown in FIG. 1, example embodiments should not be limited to this example. Rather, the ECC engine 351 may be embodied as part of the controller 310.

The buffer controller 340 may write data to and/or read data from the external buffer 360. According to at least some example embodiments, the external buffer 360 may be embodied as a volatile memory, such as a RAM, a SRAM, a DRAM, a buffer memory, etc. However, example embodiments should not be limited to these examples.

The external buffer 360 may include a first region to store a mapping table for logical address-to-physical address information for a plurality of memory modules 410, 430, . . . , 450, and a second region to function as a cache for data processing. An example table TABLE1, which may be stored in the external buffer 360, will be described in more detail later with regard to FIG. 12A.

According to at least some example embodiments, when the controller 310 and the external buffer 360 are embodied in different respective semiconductor chips, the controller 310 and the external buffer 360 may be embodied in a package (e.g., a package-on-package (PoP), a multi-chip package (MCP), a system-in-package (SiP), etc.). However, example embodiments should not be limited to these examples. For example, a first chip including the external buffer 360 may be stacked above a second chip including the controller 310 using stack balls.

The memory cluster 400 may include a plurality of memory modules 410, 430, . . . , 450. In one example, a first memory module 410 may be connected to a first main channel CHA, a second memory module 430 may be connected to a second main channel CHB, and a third memory module 450 may be connected to a third main channel CHC.

A main channel (e.g., main channels CHA, CHB and CHC) may be an independent data path between the controller 310 and a corresponding memory module. The data path may include a plurality of transmission lines to transmit data and/or control signals.

As discussed herein, a "way" refers to a group of one or more non-volatile memories sharing the same main channel. A plurality of ways may be connected to one main channel. Example structure and operation of each of the modules 410, 430, . . . , 450 will be described in more detail later with regard to FIGS. 2 to 8.

Figure 2:
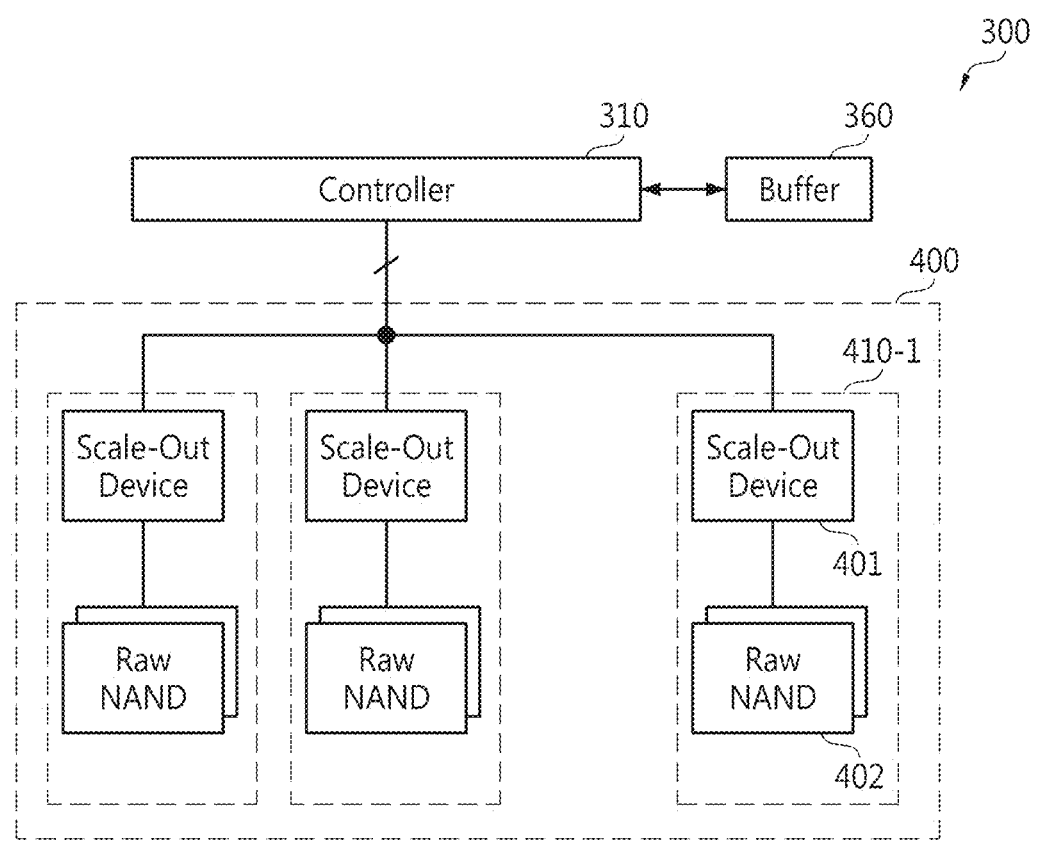
FIG. 2 is a detailed block diagram of an example embodiment of the data storage device shown in FIG. 1.

FIG. 2 is a detailed block diagram of an example embodiment of the data storage device 300 shown in FIG. 1.

Referring to FIG. 2, the memory cluster 400 includes a plurality of memory modules 410-1. Each of the plurality of memory modules 410-1 includes at least one scale-out device 401 and a plurality of non-volatile memories 402. The plurality of non-volatile memories 402 may include a plurality of non-volatile memory devices, a plurality of non-volatile memory chips (e.g., NAND chips), and/or a plurality of non-volatile memory packages 402. Each scale-out device 401 may be connected to one channel or one way.

In one example, when the controller 310 supports an A-channel by B-way configuration, the number of the scale-out devices 401 may be A*B. However, example embodiments should not be limited to this example. Here, each of A and B is a natural number greater than or equal to two (2). In one example, if each of A and B is eight (i.e., A=8 and B=8), then the number of the scale-out devices 401 included in the memory cluster 400 is 64.

According to at least some example embodiments, the scale-out device 401 may have a C-channel by D-way extensible structure, and support a high speed volatile memory interface function for storing logical address-to-physical address mapping information for non-volatile memory devices, which are extended C*D times. In one example, the scale-out device 401 may include a buffer (e.g., DRAM) for supporting the high-speed volatile memory interface function. Here, each of C and D is a natural number greater than or equal to two (2).

Figure 3:
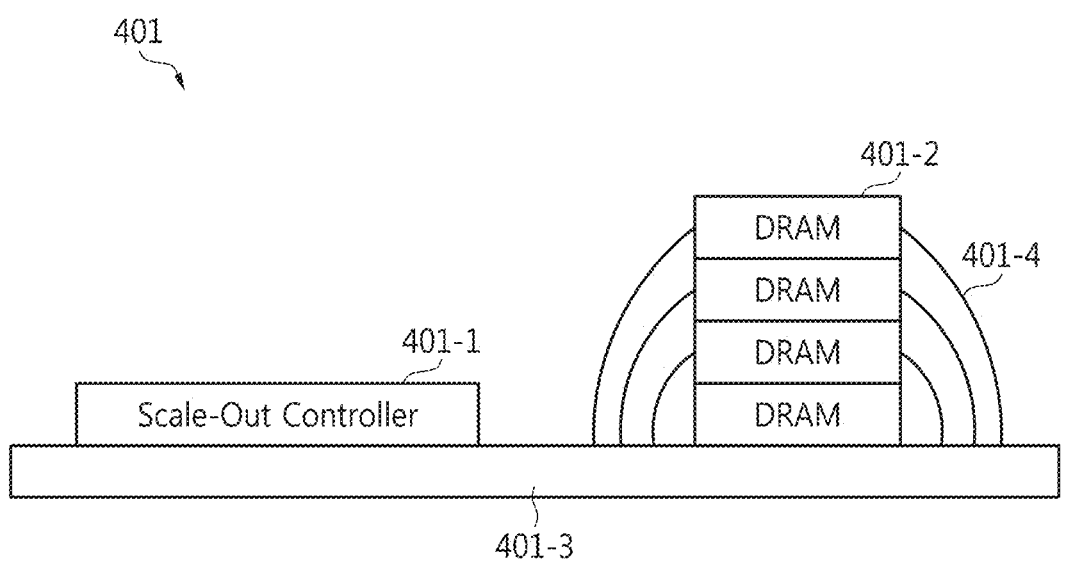
FIG. 3 is a block diagram of an example embodiment of the scale-out device shown in FIG. 2.

FIG. 3 is a block diagram of an example embodiment of the scale-out device 401 shown in FIG. 2.

Referring to FIG. 3, the scale-out device 401 includes a scale-out controller 401-1 and one or more buffers 401-2. The scale-out controller 401-1 and the one or more buffers 401-2 are on a semiconductor substrate 401-3. According to at least some example embodiments, the scale-out device 401 may be embodied as a multi-chip package (MCP). However, example embodiments should not be limited to this example. In one example, a buffer may be embodied as a DRAM, and/or a plurality of DRAMs may be arranged in a stack structure. In this case, each of the plurality of DRAMs may communicate with the scale-out controller 401-1 through bonding wires 401-4.

Figure 4:
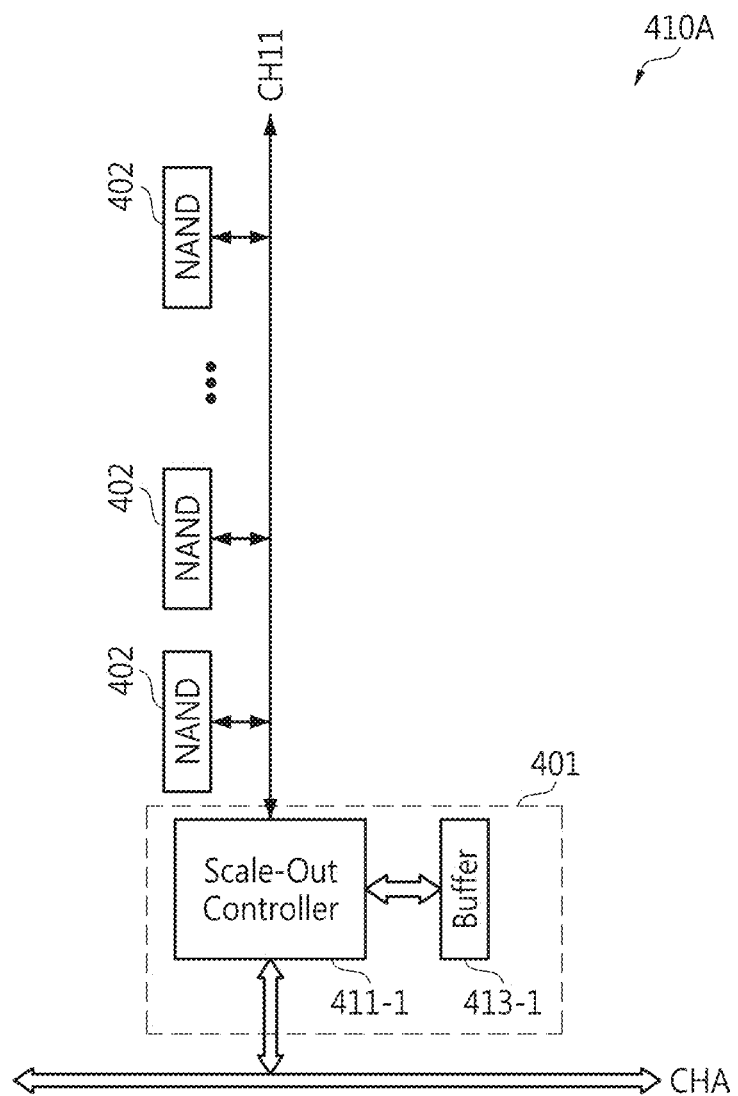
FIG. 4 is a block diagram illustrating an example embodiment of the first memory module shown in FIG. 1.

FIG. 4 is a block diagram which shows an example embodiment of a first memory module 410 shown in FIG. 1.

Referring to FIGS. 1 to 4, each of the memory modules 410, 430, . . . , 450 may have the same or substantially the same structure and operation. As a result, only a first memory module 410A will be described for the sake of brevity.

The first memory module 410A includes a scale-out device 401 connected between a first main channel CHA and a plurality of non-volatile memory devices 402. In this example, the plurality of non-volatile memory devices 402 are NAND-type flash memories. The scale-out device 401 includes a scale-out controller 411-1 and a volatile memory (buffer) 413-1. The scale-out controller 411-1 may correspond to the scale-out controller 401-1 shown in FIG. 3 and the volatile memory 413-1 may correspond to the one or more buffers 401-2 shown in FIG. 3.

The scale-out controller 411-1 is connected to the first main channel CHA, a local channel CH11, and the volatile memory 413-1.

The scale-out controller 411-1 may control operation of the volatile memory 413-1, and of each of non-volatile memory devices 402 connected to the local channel CH11.

Although the non-volatile memory devices 402 are described herein as NAND-type flash memories, example embodiments should not be limited to this example. Rather, each of the non-volatile memory devices 402 may be embodied as a PRAM device, a MRAM device, a STT-MRAM device, a FRAM device, a RRAM device, etc.

The NAND-type flash memory NAND 402 may be a die, a chip die, a chip, or a memory package. The NAND-type flash memory NAND 402 may include a memory cell array including a plurality of memory cells and an access control circuit to control data processing operations (e.g., program operations, read operations, or erase operations) for the memory cell array.

Each of the plurality of memory cells may be a single-level cell (SLC), which stores information corresponding to one-bit, or a multi-level cell (MLC), which stores multi-bit information. According to at least some example embodiments, the memory cell array may include two dimensionally arranged NAND-type flash memory cells. According to at least some example embodiments, the memory cell array may include three-dimensionally vertical NAND-type flash memory cells.

In at least some example embodiments, the memory cell array may be a three dimensional (3D) memory array. The 3D memory array may be monolithically formed in one or more physical levels of arrays of memory cells having an active area disposed above a silicon substrate and circuitry associated with the operation of those memory cells, whether such associated circuitry is above or within such substrate. The term "monolithic" refers to layers of each level of the array being directly deposited on the layers of each underlying level of the array.

In at least some example embodiments, the 3D memory array may include vertical NAND strings that are vertically oriented such that at least one memory cell is located over another memory cell. The at least one memory cell may include a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Patent Application Publication No. 2011/0233648.

Still referring to FIG. 4, the local channel CH11 is an independent data path between the scale-out controller 411-1 and the NAND-type flash memories NAND 402. The data path may include transmission lines for transmitting data and/or control signals. The group of one or more NAND-type flash memories NAND 402 sharing the local channel CH11 is referred to as a "way." And, a plurality of ways may be connected to the local channel CH11. According to at least some example embodiments, the plurality of NAND-type flash memories (or non-volatile memory devices) connected to the local channel may be referred to as a group or subset of NAN-type flash memories (or non-volatile memory devices).

According to at least some example embodiments, the scale-out controller 411-1 may control data processing operations for each of the NAND-type flash memories NAND 402 connected to the local channel CH11, and/or data processing operations for the volatile memory 413-1 independently, or according to a control of the controller 310.

The volatile memory 413-1 may be a buffer or a buffer memory, and may be embodied as a RAM, a SRAM, a DRAM, etc. However, example embodiments of the volatile memory 413-1 should not be limited to these examples. According to at least some example embodiments, the volatile memory 413-1 may include a first memory region, which may store logical address-to-physical address mapping information (e.g., a mapping table) for the NAND-type flash memories NAND 402 connected to the local channel CH11. In one example, the first memory region may store local logical address-to-physical address mapping information, which is not stored at the controller 310. Moreover, the volatile memory 413-1 may further include a second memory region (or cache region), which may store (e.g., temporarily store) data to be written to at least one of the NAND-type flash memories NAND 402 connected to the local channel CH11, or data output from at least one of the NAND-type flash memories NAND 402.

Figure 5:
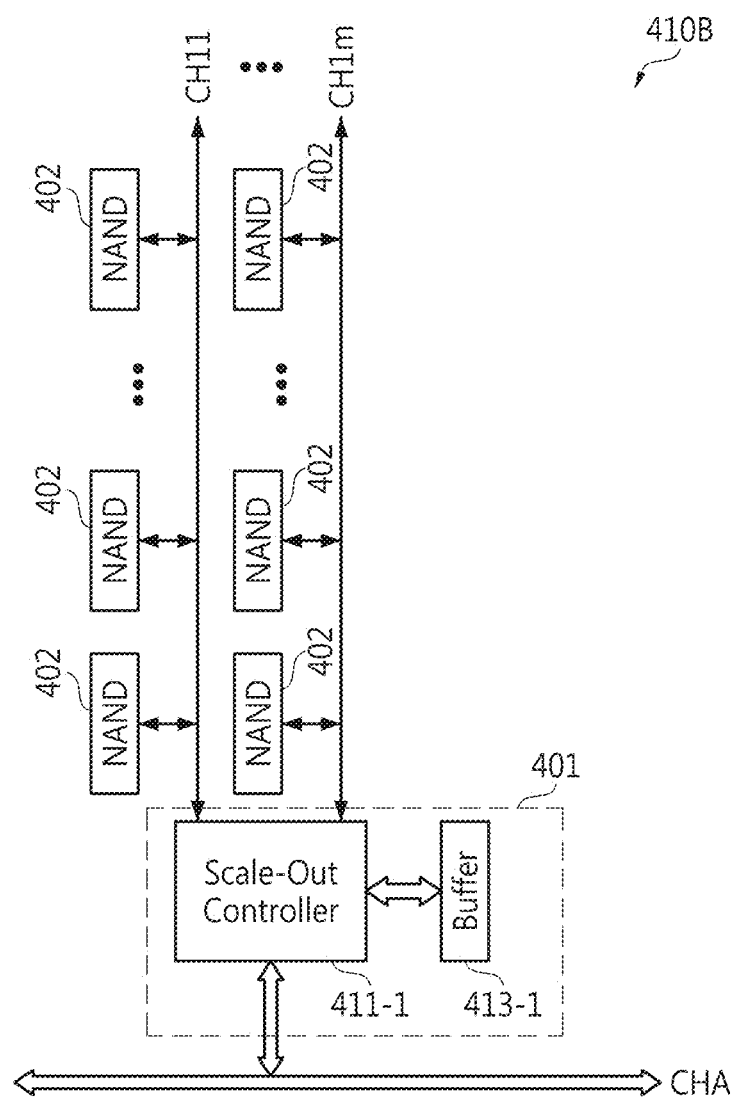
FIG. 5 is a block diagram illustrating another example embodiment of the first memory module shown in FIG. 1.

FIG. 5 is a block diagram illustrating another example embodiment of the first memory module shown 410 in FIG. 1.

Referring to FIGS. 1 to 3, and 5, each of the memory modules 410, 430, . . . , 450 may have the same or substantially the same structure and/or operation. Thus, a structure and operation of only a first memory module 410B will be described for the sake of brevity.

As shown, the first memory module 410B includes the scale-out device 401 connected between the first main channel CHA and a plurality of local channels CH11 to CH1m. A plurality of non-volatile memory devices NAND 402 are connected to each of the local channels CH11 to CH1m. The scale-out device 401 includes the scale-out controller 411-1 and the volatile memory 413-1.

The scale-out controller 411-1 is connected to the first main channel CHA, the plurality of local channels CH11 to CH1m, and the volatile memory 413-1. The scale-out controller 411-1 may control operations of the volatile memory 413-1 and each of non-volatile memory devices NAND 402 (e.g., NAND-type flash memories) connected to each of the local channels CH11 to CH1m.

In the example embodiment shown in FIG. 5, a first group of NAND-type flash memories NAND 402 are connected to a first of the local channels CH11, and an $m^{th}$ group of NAND-type flash memories NAND 402 are connected to an $m^{th}$ one of the local channels CH1m. In one example, a first plurality of ways may be connected to the first local channel CH11, and an $m^{th}$ plurality of ways may be connected to the $m^{th}$ local channel CH1m. Although only two local channels are illustrated in FIG. 5, the example embodiment of the first memory module 410B may include any number of local channels.

The scale-out controller 411-1 may control data processing operations for each of the NAND-type flash memories NAND 402 connected to each of the local channels CH11 to CH1m, and/or data processing operations of the volatile memory 413-1 independently, or according to a control of the controller 310.

According to at least some example embodiments, the volatile memory 413-1 may include a first memory region, which may store logical address-to-physical address mapping information (e.g., a mapping table) for the NAND-type flash memories NAND 402 connected to each of the local channels CH11 to CH1m. In one example, the first memory region may store local logical address-to-physical address mapping information, which is not stored at the controller 310. Moreover, the volatile memory 413-1 may further include a second memory region (or cache region), which may store (e.g., temporarily store) data to be written to and/or read from at least one of the NAND-type flash memories NAND 402 connected to each of the local channels CH11 to CH1m.

Figure 6:
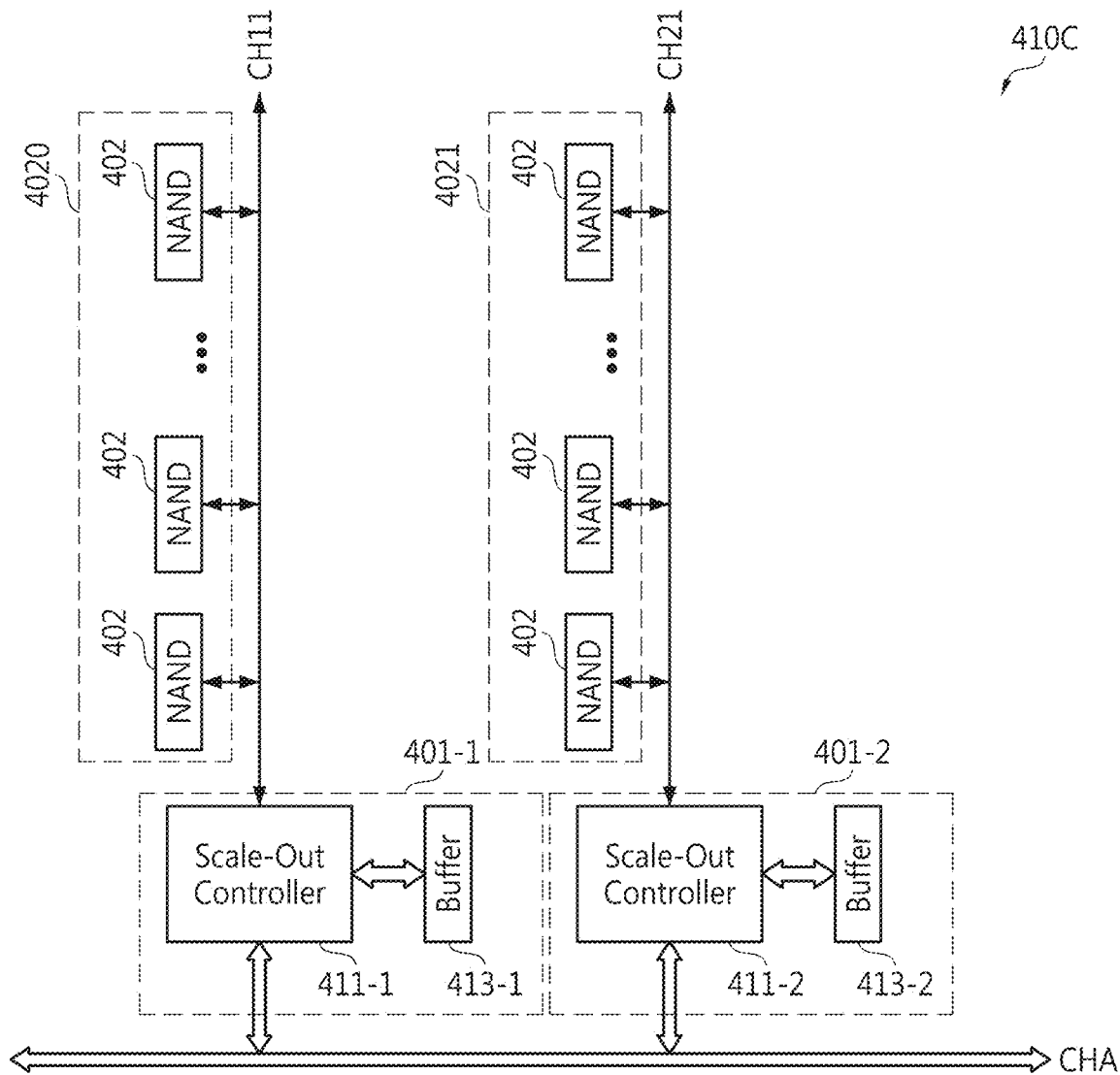
FIG. 6 is a block diagram illustrating still another example embodiment of the first memory module shown in FIG. 1.

FIG. 6 is a block diagram illustrating still another example embodiment of the first memory module 410 shown in FIG. 1.

Referring to FIGS. 1 to 3, and 6, each of the memory modules 410, 430, . . . , 450 may have the same or substantially the same structure and/or operation. Thus, only a structure and operation of a first memory module 410C will be described for the sake of brevity.

As shown, the first memory module 410C includes a plurality of scale-out devices 401-1 and 401-2 and a plurality of groups of non-volatile memory devices 4020 and 4021. Each of the plurality of groups of non-volatile memory devices includes a plurality of non-volatile memory devices NAND 402. Although only two scale-out devices 401-1 and 401-2 and two groups of non-volatile memory devices 4020 and 4021 are shown in FIG. 6, it should be understood that the first memory module 410C may include any number of scale-out devices and groups of non-volatile memory devices.

In more detail, the first memory module 410C includes: a first scale-out controller 411-1 connected between the first main channel CHA and a first local channel CH11; a first volatile memory 413-1 connected to the first scale-out controller 411-1; a first group of non-volatile memory devices 4020 connected to the first local channel CH11 and including a plurality of NAND-type flash memories NAND 402; a second scale-out controller 411-2 connected between the first main channel CHA and a second local channel CH21; a second volatile memory 413-2 connected to the second scale-out controller 411-2; and a second group of non-volatile memory devices 4021 connected to the second local channel CH21 and including a plurality of NAND-type flash memories NAND 402.

In at least the example embodiment shown in FIG. 6, NAND-type flash memories NAND 402 in the first group of non-volatile memory devices 4020 are connected to the first local channel CH11, and NAND-type flash memories NAND 402 in the second group of non-volatile memory devices 4021 are connected to the second local channel CH21. A first plurality of ways may be connected to the first local channel CH11, and a second plurality of ways may be connected to the second local channel CH21.

The first scale-out controller 411-1 may control data processing operations for each of the NAND-type flash memories NAND 402 connected to the first local channel CH11 and/or data processing operations for the first volatile memory 413-1 independently or according to a control of the controller 310.

According to at least some example embodiments, the first volatile memory 413-1 may include a first memory region, which may store logical address-to-physical address mapping information (e.g., mapping table) for the NAND-type flash memories NAND 402 connected to the first local channel CH11. In one example, the first memory region may store local logical address-to-physical address mapping information, which is not stored at the controller 310. Moreover, the first volatile memory 413-1 may further include a second memory region (or cache region), which may store (e.g., temporarily store) data to be written in at least one of the NAND-type flash memories NAND 402 connected to the first local channel CH11 and/or data output from at least one of the NAND-type flash memories NAND 402.

The second scale-out controller 411-2 may control data processing operations for each of the NAND-type flash memories NAND 402 connected to the second local channel CH21, and/or data processing operations for the second volatile memory 413-2 independently or according to a control of the controller 310.

According to at least some example embodiments, the second volatile memory 413-2 may include a first memory region, which may store logical address-to-physical address mapping information (e.g., a mapping table) for the NAND-type flash memories NAND 402 connected to the second local channel CH21. In one example, the first memory region may store local logical address-to-physical address mapping information, which is not stored at the controller 310. Moreover, the second volatile memory 413-2 may further include a second memory region (or cache region), which may store (e.g., temporarily store) data to be written in at least one of the NAND-type flash memories NAND 402 connected to the second channel CH21 and/or data output from at least one of the NAND-type flash memories NAND 402.

Figure 7:
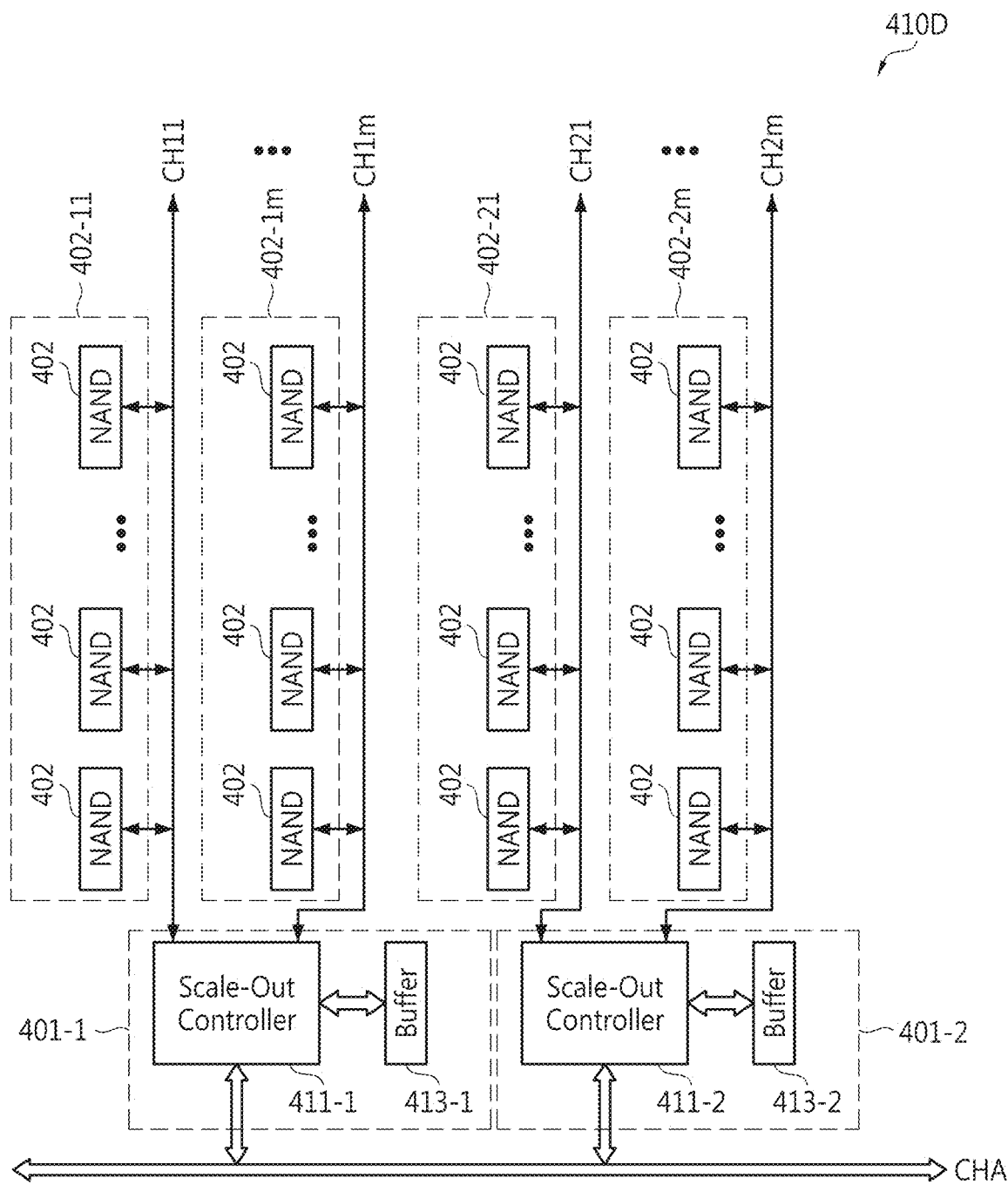
FIG. 7 is a block diagram illustrating still another example embodiment of the first memory module shown in FIG. 1.

FIG. 7 is a block diagram illustrating still another example embodiment of the first memory module 410 shown in FIG. 1.

Referring to FIGS. 1 to 3, and 7, each of the memory modules 410, 430, . . . , 450 may have the same or substantially the same structure and/or operation. Thus, a structure and operation of only the first memory module 410D will be described for the sake of brevity.

The first memory module 410D includes scale-out devices 401-1 and 401-2 and a plurality of non-volatile memory devices NAND 402. The plurality of non-volatile memory devices NAND 402 are arranged in groups of non-volatile memory devices. The first scale-out device 401-1 includes a first scale-out controller 411-1 and a first volatile memory 413-1, and the second scale-out 401-2 includes a second scale-out controller 411-2 and a second volatile memory 413-2.

The first scale-out controller 411-1 is connected to the main channel CHA, local channels CH11 to CH1$m$, and the first volatile memory 413-1. In this example, each NAND-type flash memory NAND 402 in a first group of non-volatile memories 402-11 is connected to the local channel CH11, and each NAND-type flash memory NAND 402 in a second group of non-volatile memories 402-1$m$ is connected to the local channel CH1$m$.

The first volatile memory 413-1 may include a first memory region, which may store logical address-to-physical address mapping information (e.g., mapping table) for corresponding NAND-type flash memories NAND 402 connected to each of the local channels CH11 to CH1$m$. In one example, the first memory region may store local logical address-to-physical address mapping information, which is not stored at the controller 310. Moreover, the first volatile memory 413-1 may further include a second memory region (or cache region), which may store (e.g., temporarily store) data to be written to at least one of the NAND-type flash memories NAND connected to the local channels CH11 to CH1$m$, and/or data output from at least one of the NAND-type flash memories NAND connected the local channels CH11 to CH1$m$.

The second scale-out controller 411-2 is connected to the main channel CHA, local channels CH21 to CH2$m$, and the second volatile memory 413-2. In this example, each NAND-type flash memory NAND 402 in a first group of non-volatile memories 402-21 is connected to the local channel CH21, and each NAND-type flash memory NAND 402 in a second group of non-volatile memories 402-2$m$ is connected to the local channel CH2$m$.

The second volatile memory 413-2 may include a first memory region, which may store logical address-to-physical address mapping information (e.g., mapping table) for NAND-type flash memories connected to each of the local channels CH21 to CH2$m$. In one example, the first memory region may store local logical address-to-physical address mapping information, which is not stored at the controller 310. Moreover, the second volatile memory 413-2 may further include a second memory region (or cache region), which may store (e.g., temporarily store) data to be written to at least one of the NAND-type flash memories NAND 402 connected to the local channels CH21 to CH2$m$, and/or data output from at least one of the NAND-type flash memories NAND 402 connected to the local channels CH21 to CH2$m$.

Figure 8:
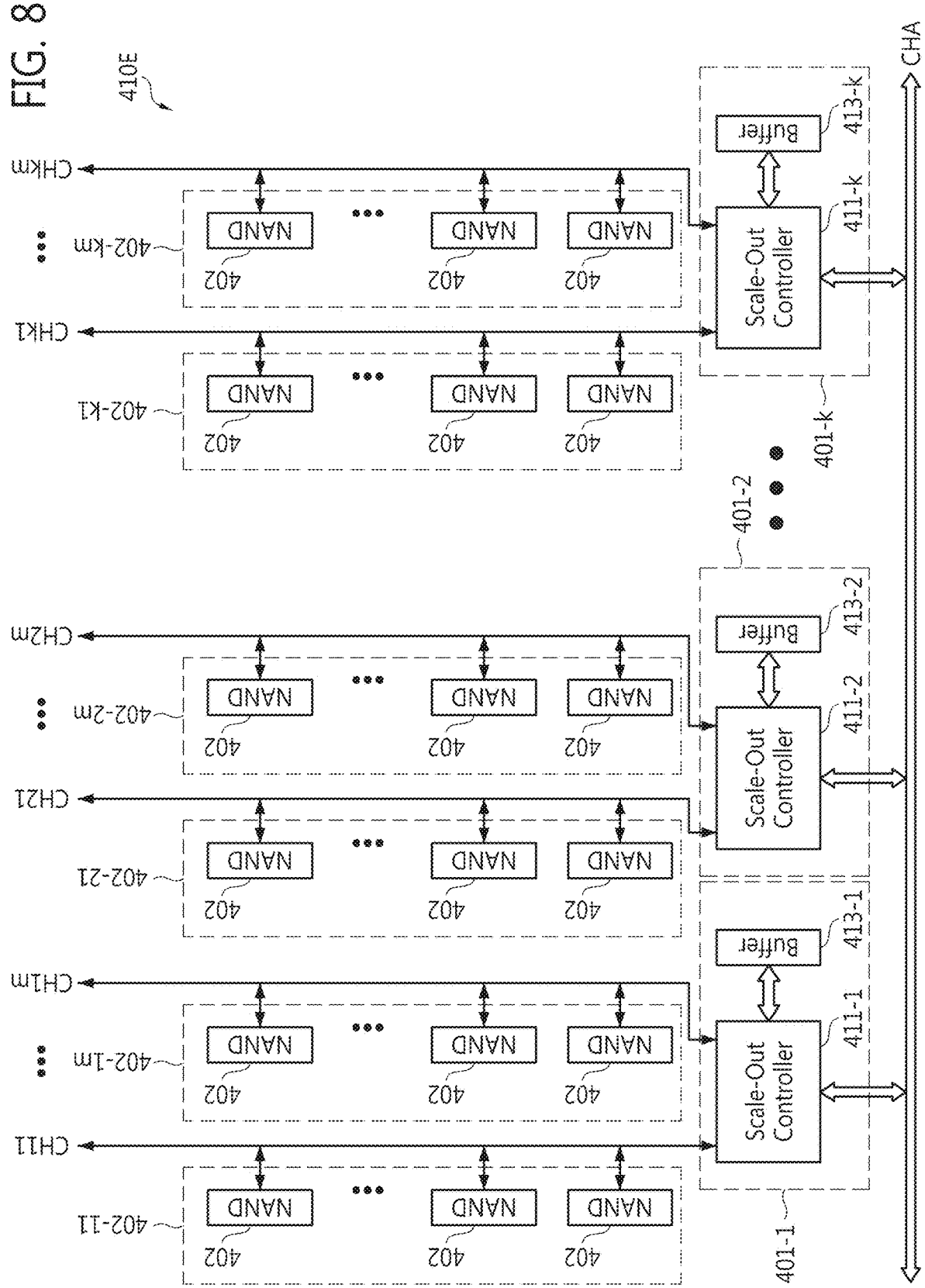
FIG. 8 is a block diagram illustrating still another example embodiment of the first memory module shown in FIG. 1.

FIG. 8 is a block diagram illustrating still another example embodiment of the first memory module 410 shown in FIG. 1.

Referring to FIGS. 1 to 3, and 8, each of the memory modules 410, 430, . . . , 450 may have the same or substantially the same structure and/or operation. Thus, a structure and operation of only a first memory module 410E will be described for the sake of brevity.

As shown, the first module 410E includes a plurality of scale-out devices 401-1 to 401-$k$, and a plurality of non-volatile memory devices NAND 402. The plurality of non-volatile memory devices NAND 402 are arranged in groups of non-volatile memory devices. The first scale-out device 401-1 includes a first scale-out controller 411-1 and a first volatile memory 413-1; the second scale-out 401-2 includes a second scale-out controller 411-2 and a second volatile memory 413-2; and the k$^{th}$ scale-out device 401-k includes a k$^{th}$ scale-out controller 411-k and a k$^{th}$ volatile memory 413-k.

The first scale-out controller 411-1 is connected to the main channel CHA, the local channels CH11 to CH1m, and the first volatile memory 413-1. In this example, each NAND-type flash memory NAND 402 in a first group of non-volatile memories 402-11 is connected to the local channel CH11, and each NAND-type flash memory NAND 402 in a second group of non-volatile memories 402-1m is connected to the local channel CH1m.

The first volatile memory 413-1 may include a first memory region, which may store logical address-to-physical address mapping information (e.g., a mapping table) for NAND-type flash memories connected to each of the local channels CH11 to CH1m. In one example, the first memory region may store local logical address-to-physical address mapping information, which is not stored at the controller 310. Moreover, the first volatile memory 413-1 may further include a second memory region (or cache region), which store (e.g., temporarily store) data to be written to at least one of the corresponding NAND-type flash memories NAND 402 connected to the local channels CH11 to CH1m, and/or data output from at least one of the corresponding NAND-type flash memories NAND 402 connected to the local channels CH11 to CH1m.

The second scale-out controller 411-2 is connected to the main channel CHA, the local channels CH21 to CH2m, and the second volatile memory 413-2. In this example, each NAND-type flash memory NAND 402 in a third group of non-volatile memories 402-21 is connected to the local channel CH21, and each NAND-type flash memory NAND 402 in a fourth group of non-volatile memories 402-2m is connected to the local channel CH2m.

The second volatile memory 413-2 may include a first memory region, which may store logical address-to-physical address mapping information (e.g., a mapping table) for NAND-type flash memories NAND connected to each of the local channels CH21 to CH2m. In one example, the first memory region may store local logical address-to-physical address mapping information, which is not stored at the controller 310. Moreover, the second volatile memory 413-2 may further include a second region (or cache region), which may store (e.g., temporarily store) data to be written to at least one of the NAND-type flash memories NAND connected to the local channels CH21 to CH2m, and/or data output from at least one of the NAND-type flash memories NAND connected to the local channels CH21 to CH2m.

A k$^{th}$ scale-out controller 411-k is connected to the main channel CHA, the local channels CHk1 to CHkm, and a k$^{th}$ volatile memory 413-k. In this example, each NAND-type flash memory NAND 402 in a fifth group of non-volatile memories 402-1k is connected to the local channel CHk1, and each NAND-type flash memory NAND 402 in a sixth group of non-volatile memories 402-km is connected to the local channel CHkm.

The k$^{th}$ volatile memory 413-k may include a first memory region, which may store logical address-to-physical address mapping information (e.g., a mapping table) for NAND-type flash memories NAND 402 connected to each of the local channels CHk1 to CHkm. In one example, the first memory region may store local logical address-to-physical address mapping information, which is not stored at the controller 310. Moreover, the k$^{th}$ volatile memory 413-k may further include a second memory region (or cache region), which may store (e.g., temporarily store) data to be written to at least one of the NAND-type flash memories NAND connected to the local channels CHk1 to CHkm, and/or data output from at least one of the NAND-type flash memories NAND connected to the local channels CHk1 to CHkm.

Referring back to FIG. 1, according to at least one example embodiment, the memory module 410 connected to the main channel CHA may be embodied as one of the memory modules 410A to 410E described with regard to FIGS. 4 to 8, the memory module 430 connected to a main channel CHB may be embodied as one of the memory modules 410A to 410E described with regard to FIGS. 4 to 8, and the memory module 450 connected to a main channel CHC may be embodied as one of the memory modules 410A to 410E described with regard to FIGS. 4 to 8. Each of the volatile memories 413-1 to 413-k may be a buffer or a buffer memory, and may be embodied as a RAM, a SRAM, a DRAM, etc. However, example embodiments should not be limited to these examples.

Figure 9:
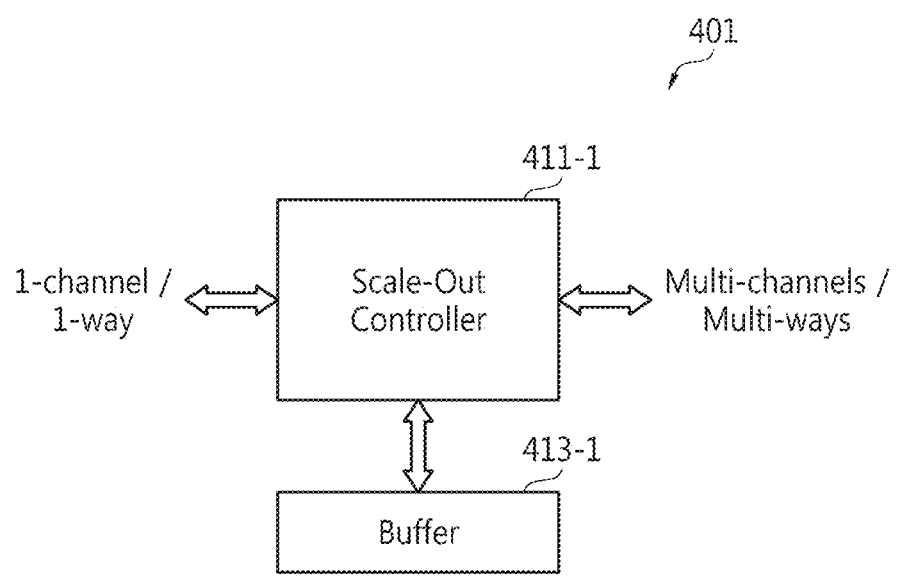
FIG. 9 is a schematic diagram of an example embodiment of the scale-out device shown in one or more of FIGS. 2 through 8.
Figure 10:
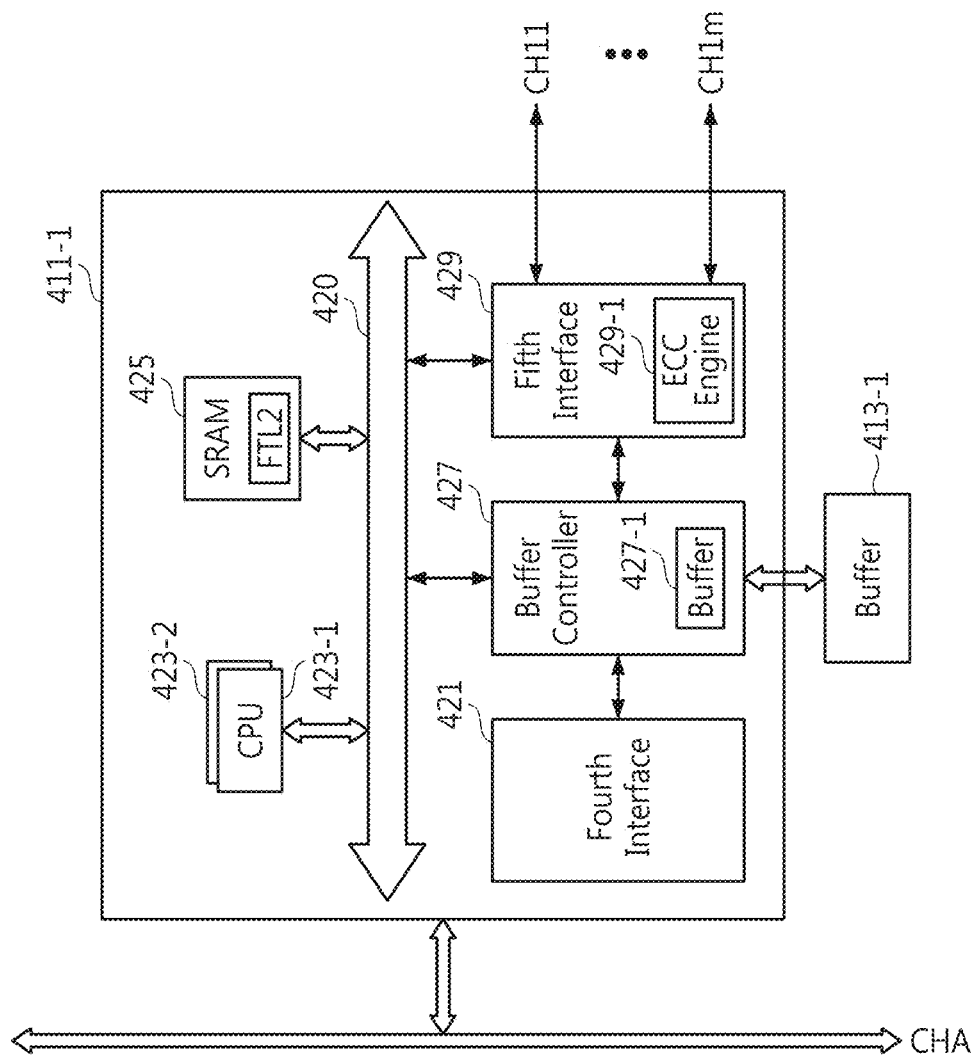
FIG. 10 is a block diagram of an example embodiment of the scale-out controller shown in FIG. 9.

FIG. 9 is a schematic diagram of an example embodiment of the scale-out device shown in FIGS. 2 through 8. FIG. 10 is a block diagram of an example embodiment of the scale-out controller shown in FIG. 9.

Referring to FIGS. 1 through 10, each of the scale-out controllers 411-1 to 411-k may have the same or substantially the same structure and/or operation. Thus, only a structure and operation of the first scale-out controller 411-1 will be described for the sake of brevity.

The first scale-out controller 411-1 may control commands and/or data transmitted and/or received among the controller 310, the first volatile memory 413-1, and NAND-type flash memories NAND 402 connected to the first scale-out controller 411-1. According to at least some example embodiments, the first scale-out controller 411-1 may be embodied as a chip, an IC, a SoC, etc. When the first volatile memory 413-1 is embodied as a DRAM, for example, the first scale-out controller 411-1 may include a DRAM interface.

The first scale-out controller 411-1 may include an input terminal (or input port) connected to a channel (or way), output terminals (or output ports) connected to a plurality of channels (or a plurality of ways), and an interface connected to first volatile memory 413-1.

Referring in more detail to the example embodiment shown in FIG. 10, the first scale-out controller 411-1 includes: a bus architecture (or bus) 420; a fourth interface 421; at least one CPU 423-1 and/or 423-2; an internal memory 425; a buffer controller 427; and a fifth interface 429. The bus architecture 420 may be embodied as an AMBA, an AHB, an APB, an AXI, an ASB, a combination thereof, or the like. However, example embodiments should not be limited to these examples.

The fourth interface 421 may change a format of responses and/or data to be transmitted to the controller 310, and transmit the changed responses and/or data to the controller 310 through the main channel CHA. Moreover, the fourth interface 421 may receive commands and/or data transmitted from the controller 310, change a format of the received commands and/or data, and transmit the changed commands and/or data to the at least one CPU 423-1, 423-2 and/or to the buffer controller 427. According to at least some example embodiments, the fourth interface 421 may include a transceiver, which may transmit and/or receive signals and/or data.

Structure and/or operation of the fourth interface 421 may be embodied to be compatible with or suitable for the structure and/or operation of the third interface 350. For example, the fourth interface 421 may be embodied as a SATA interface, a SATAe interface, a SAS, a PCIe interface, an NVMe interface, an AHCI, a NAND-type flash memory interface, a NOR-type flash memory interface, etc. However, example embodiments should not be limited to these examples. According to at least some example embodiments, the fourth interface 421 may be connected to a (e.g., one) channel or a (e.g., one) way.

The at least one CPU 423-1, 423-2 may control the fourth interface 421, the internal memory 425, the buffer controller 427, and the fifth interface 429 through the bus architecture 420. Each of the at least one CPU 423-1, 423-3 may include one or more cores.

For example, the first CPU 423-1 may control an interaction with the third interface 350 through the fourth interface 421, and the second CPU 423-2 may control an interaction with the NAND-type flash memories NAND 402 connected to, for example, the local channels CH11 to CH1m through the fifth interface 429. According to at least some example embodiments, the first CPU 423-1 and the second CPU 423-2 may compose a multi-CPU. In one example, the first CPU 423-1 may control the second CPU 423-2 or vice-versa.

Still referring to FIG. 10, the internal memory 425 may store data necessary for operation of the first scale-out controller 411-1, and/or data generated by data processing operations (e.g., a write operation and/or a read operation) performed by the first scale-out controller 411-1. In one example, the internal memory 425 may store a second FTL code FTL2, which may be executed by the CPU 423-1 and/or 423-2. According to at least some example embodiments, the internal memory 425 may be embodied as a RAM, a DRAM, a SRAM, a buffer, a buffer memory, a cache, a TCM, etc. However, example embodiments should not be limited to these examples.

The buffer controller 427 may write data to the first volatile memory 413-1 and/or read data stored in the first volatile memory 413-1 according to a control of the first CPU 423-1 or the second CPU 423-2. The buffer controller 427 may be referred to as a controller or a buffer manager, which may control write and/or read operations for the first volatile memory 413-1.

The scale-out controller 411-1 further includes an internal buffer 427-1 controlled by the buffer controller 427. Although the internal buffer 427-1 is embodied in the buffer controller 427 in the example embodiment shown in FIG. 10, the internal buffer 427-1 may be embodied as part of the scale-out controller 411-1. In one example, the internal buffer 427-11 may be embodied as a SRAM. The first volatile memory 413-1 may perform a function of an external buffer and may be embodied as a DRAM.

The fifth interface 429 may control data processing operations for NAND-type flash memories NAND 402 through a corresponding local channel from among the plurality of local channels CH11 to CH1m according to a control of the first CPU 423-1 and/or the second CPU 423-2.

As described with regard to FIGS. 4 through 8, a plurality of local channels and/or a plurality of ways may be connected to the fifth interface 429. The fifth interface 429 may be embodied as a SATA interface, a SATAe interface, s SAT, a PCIe interface, an NVMe interface, an AHCI, a NAND-type flash memory interface, a NOR-type flash memory interface, etc. However, example embodiments should not be limited to only these examples.

The ECC engine 429-1 may correct errors included in data to be stored in the non-volatile memory devices NAND and/or in data output from the non-volatile memory devices NAND 402. Although FIG. 10 illustrates the ECC engine 429-1 embodied in the fifth interface 429, the ECC engine 429-1 may be embodied anywhere in the scale-out controller 411-1.

According to at least some example embodiments, the first scale-out controller 411-1 and the first volatile memory 413-1 may be embodied in different respective semiconductor chips, and/or the first scale-out controller 411-1 and the first volatile memory 413-1 may be embodied in one package (e.g., as a PoP, MCP, or SiP). However, example embodiments should not be limited to this example. In one example, a first chip including the first volatile memory 413-1 may be stacked on or above a second chip including the first scale-out controller 411-1 using stack balls.

When the scale-out device 401 including the scale-out controller 411-1 and the volatile memory 413-1 are utilized in connection with example embodiments, scalability of capacity of the memory cluster 400 may be increased.

Figure 11:
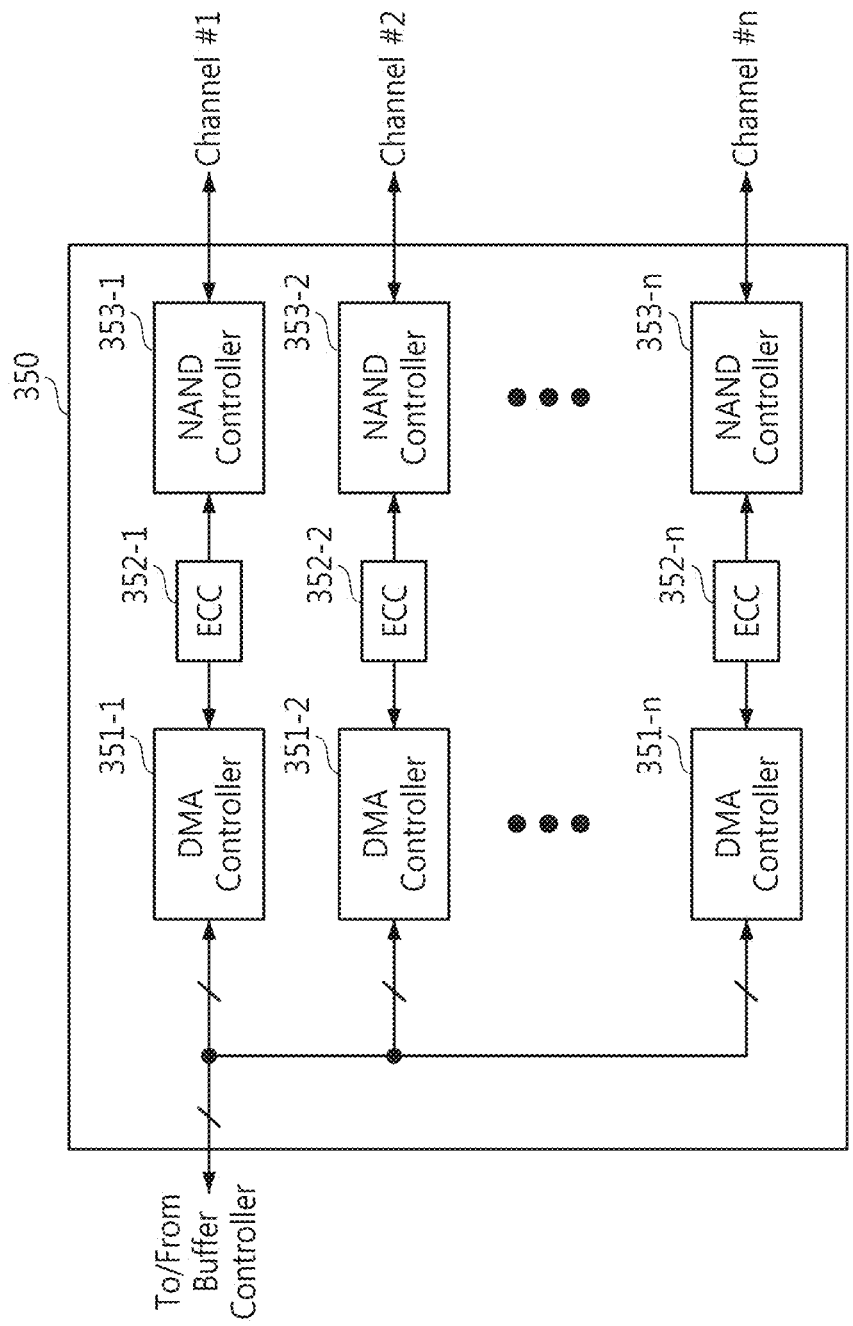
FIG. 11 is a block diagram of an example embodiment of the third interface shown in FIG. 1.

FIG. 11 is a block diagram of an example embodiment of the third interface 350 shown in FIG. 1.

Referring to FIGS. 1 and 11, the third interface 350 includes: a plurality of direct memory access (DMA) controllers 351-1 to 351-$n$, where n is a natural number greater than or equal to three (3); a plurality of ECC engines 352-1 to 352-$n$; and a plurality of NAND controllers 353-1 to 353-$n$. The NAND controller 353-1 is connected to a first channel Channel #1; the NAND controller 353-2 is connected to a second channel Channel #2; and the NAND controller 353-$n$ is connected to a n$^{th}$ channel Channel #n In at least this example embodiment, it is assumed that the first channel Channel #1 corresponds to the first main channel CHA, the second channel Channel #2 corresponds to the second main channel CHB, and the n$^{th}$ channel Channel #n corresponds to the n$^{th}$ main channel CHC in FIG. 1.

A first NAND controller 353-1 connected to the first channel Channel #1 may write data to, or read data from, the external buffer 360 using the first DMA controller 351-1 and the buffer controller 340. A second NAND controller 353-2 connected to the second channel Channel #2 may write data to, or read data from, the external buffer 360 using the second DMA controller 351-2 and the buffer controller 340. A n$^{th}$ NAND controller 353-$n$ connected to the n$^{th}$ channel Channel #n may write data to, or read data from, the external buffer 360 using a n$^{th}$ DMA controller 351-$n$ and the buffer controller 340.

As described above, according to at least some example embodiments, the third interface 350 may be embodied as a SATA interface, a SATAe interface, a PCIe interface, an NVMe interface, an AHCI, a NAND-type flash memory interface, a NOR-type flash memory interface, etc. However, for example purposes, the third interface 350 is described with regard to a NAND-type flash memory interface.

Returning to FIG. 10, according to at least some example embodiments, a structure of the fifth interface 429 may be the same or substantially the same as the third interface 350 shown in FIG. 11. Each of the ECC engines 352-1 to 352-$n$ may correct errors in data.

FIGS. 12A and 12B illustrate example logical address-to-physical address mapping tables according to example embodiments.

Referring to FIGS. 1 through 12A, in at least one example embodiment the external buffer 360 may store a first table TABLE1. According to at least some example embodiments, one or more of the CPUs 330 and 331 may execute the first FTL code FTL1 stored in the internal memory 315 to allocate logical addresses to a corresponding scale-out controller using the first table TABLE1. In the example shown in FIG. 12A, logical block addresses LBA0 to LBA999 may be allocated to a first scale-out controller Scale-Out Controller #1, logical block addresses LBA1000 to LBA1999 may be allocated to a second scale-out controller Scale-Out Controller #2, logical block addresses LBA2000 to LBA2999 may be allocated to a third scale-out controller Scale-Out Controller #3, and logical block addresses LBA3000 to LBA3999 may be allocated to a fourth scale-out controller Scale-Out Controller #4. In at least this example, the first table TABLE1 does not include physical address information for the non-volatile memory devices in the memory cluster 400. Thus, the controller 310 does not have knowledge of the direct logical-to-physical address mapping for the non-volatile memory devices. As discussed in more detail below, the logical-to-physical address information is distributed among the scale-out controllers at each memory module.

Each of the scale-out controllers Scale-Out Controller #1 to Scale-Out Controller #4 shown in FIG. 12A may be included in one of the memory modules 410, 430, . . . , 450. The data storage device 300 may include the plurality of memory modules 410, 430, . . . , 450, and each of the memory modules 410, 430, . . . , 450 may include at least one scale-out controller and at least one volatile memory.

A related art data storage device includes a legacy controller corresponding to the controller 310 and a buffer corresponding to the external buffer 360. In the related art data storage device, only a single FTL is managed by the one legacy controller. In this regard, the single FTL includes logical-to-physical address mapping information for all of the non-volatile memory devices in a memory cluster.

According to at least some example embodiments, however, the data storage device 300 includes at least one scale-out controller (also referred to as a local controller) included in at least one of the plurality of memory modules 410, 430, . . . , 450 in addition to the controller (e.g., global controller) 310, such that the FTL may be distributed among the controller 310 and the scale-out controller. In this example, a first FTL may be stored in the at least one scale-out controller, and a second FTL may be stored at the controller 310. In one example, a FTL at the controller 310 may be referred to as a global FTL, whereas a FTL at a scale-out controller may be referred to as a local FTL (also referred to herein as a distributed FTL).

According to at least some example embodiments, each of the scale-out controllers includes a local FTL, and the local FTL may manage non-volatile memory devices (e.g., NAND-type flash memory devices) 402 connected to a plurality of channels and/or a plurality of ways. Each local FTL in each scale-out controller may be implemented by one or more CPUs included in each scale-out controller. Each local FTL in each scale-out controller may be combined with a legacy controller (e.g., a legacy SSD controller) in a hierarchical or distributed structure.

In addition, according to at least some example embodiments each of scale-out controllers 411-1 to 411-k may store logical address-to-physical address mapping information for non-volatile memory devices (e.g., NAND-type flash memory devices NAND) controlled by each of the scale-out controllers 411-1 to 411-k in each of volatile memories 413-1 to 413-k connected to each of the scale-out controllers 411-1 to 411-k. In one example, each of scale-out controllers 411-1 to 411-k may store logical address-to-physical address mapping information for only non-volatile memory devices (e.g., NAND-type flash memory devices NAND) connected to the respective scale-out controller. And, the logical address-to-physical address mapping information stored at the scale-out controllers 411-1 to 411-k is not stored at the controller 310. A CPU included in each scale-out controller may control write operations and/or read operations using the stored logical address-to-physical address mapping information.

According to at least some example embodiments, each volatile memory connected to each scale-out controller may store only logical address-to-physical address mapping information associated with or regarding NAND-type flash memory devices controlled by the respective scale-out controller. In this regard, the logical address-to-physical address mapping information associated with or regarding NAND-type flash memory devices controlled by the respective scale-out controller may be referred to as local logical address-to-physical address mapping information. Accordingly, logical address-to-physical address mapping information on all NAND-type flash memory devices may be distributed among volatile memories connected to each scale-out controller.

FIG. 12B illustrates an example of a local logical-to-physical address mapping table, which may be stored at a first volatile memory 413-1 according to a control of the first scale-out controller 411-1. As shown in FIG. 12B, the second table TABLE2 may store mapping information on non-volatile memory devices controlled by the first scale-out controller 411-1. In FIG. 12B, PPN refers to physical addresses (e.g., physical page numbers) of the NAND-type flash memory devices.

Referring to FIGS. 12A and 12B, in one example, logical address LBA200 is allocated to the first scale-out controller 411-1 (Scale-Our Controller #1), and the logical address LBA200 is mapped to a physical address PPN200 of the non-volatile memory device controlled by the first scale-out controller 411-1. In this example, the CPU 330 and/or 331 may execute the first FTL code FTL1 to determine and/or allocate the first scale-out controller 411-1 corresponding to the logical address LBA200, and the CPU 423-1 and/or 423-2 may execute the second FTL code FTL2 to determine and/or allocate the physical address PPN200 corresponding to the LBA200.

As shown in FIG. 12A, the data storage device 300 according to at least some example embodiments may not store direct logical-to-physical address (LBA-to-PPN) mapping information of all non-volatile memory devices NAND included in the memory cluster 400. Rather, the data storage device 300 stores a mapping of only logical addresses (LBA) to IDs of scale-out controllers. That is, for example, the data storage device 300 does not store, and may not have knowledge of, the physical address information (e.g., PPN) to which the logical addresses (e.g., LBAs) are mapped. Accordingly, the data storage device 300 may store a first table TABLE1 having a relatively small size in the external buffer 360, thereby reducing memory capacity requirements for the external buffer 360.

As described above with regard to FIGS. 1 through 12B, a FTL and associated address mapping information may be distributed among a plurality of scale-out controllers, such that a volatile memory connected to each of the plurality of scale-out controllers may store distributed (or local) logical address-to-physical address mapping information (e.g., a mapping table). Accordingly, the data storage device 300 may be embodied as a data storage device having a distributed scale-out structure.

Figure 13:
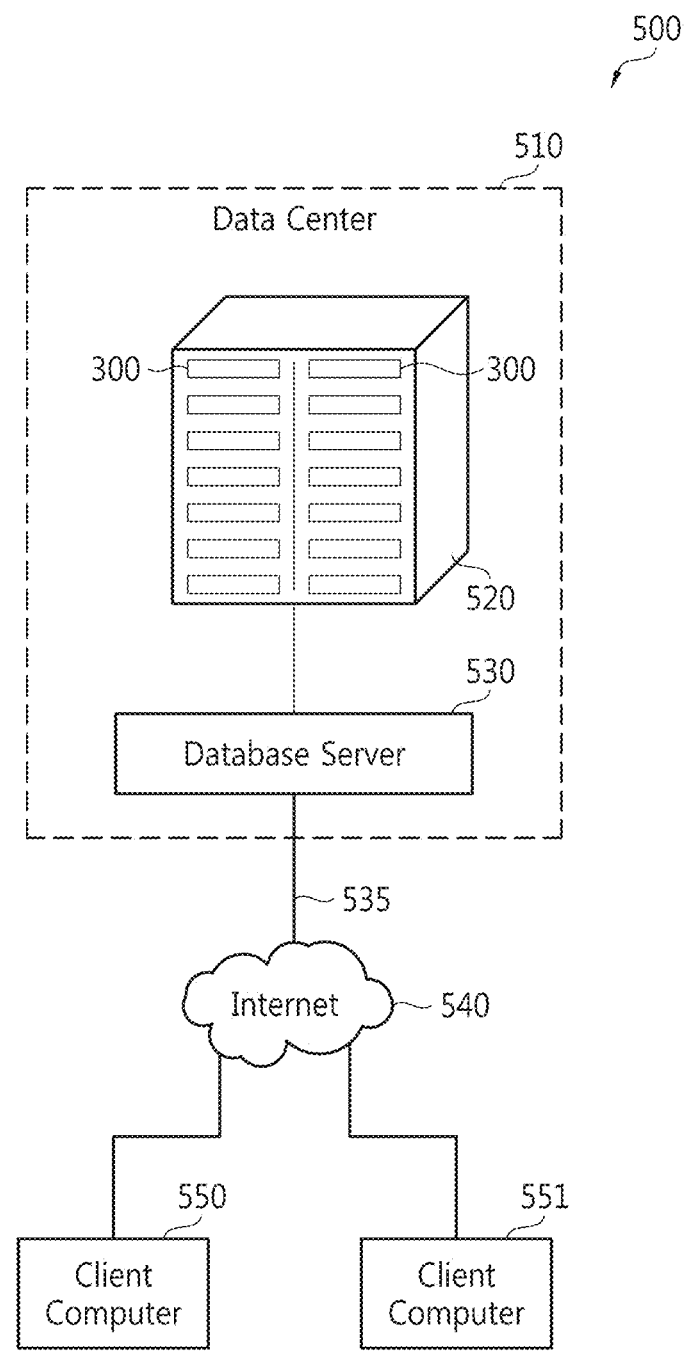
FIG. 13 is a block diagram of a data processing system according to another example embodiment of inventive concepts.

FIG. 13 is a block diagram of a data processing system according to another example embodiment.

Referring to FIG. 13, the data processing system 500 includes: a data center 510; a first network 535; a second network 540; and a plurality of client computers 550 and 551. The data center 510 may be an Internet data center (IDC) or a cloud data center, and may include a database 520 and a database server 530.

The database 520 may include a plurality of data storage devices 300. The plurality of data storage devices 300 may be installed in a rack. A structure and/or operation of each data storage device 300 may be the same or substantially the same as a structure and/or operation of one or more example embodiments of the data storage devices described herein with regard to one or more of FIGS. 1 through 12B.

The database server 530 may control an operation of each of the plurality of data storage devices 300. The database server 530 may be connected to the second network 540 (e.g., the Internet) through the first network (e.g., a local area network (LAN)) 535. For example, the database server 530 may be embodied as a web server, a mail server, or the like. However, example embodiments should not be limited to these examples. Each of the plurality of client computers 550 and 551 may be connected to the database server 530 through the second network 540.

Figure 14:
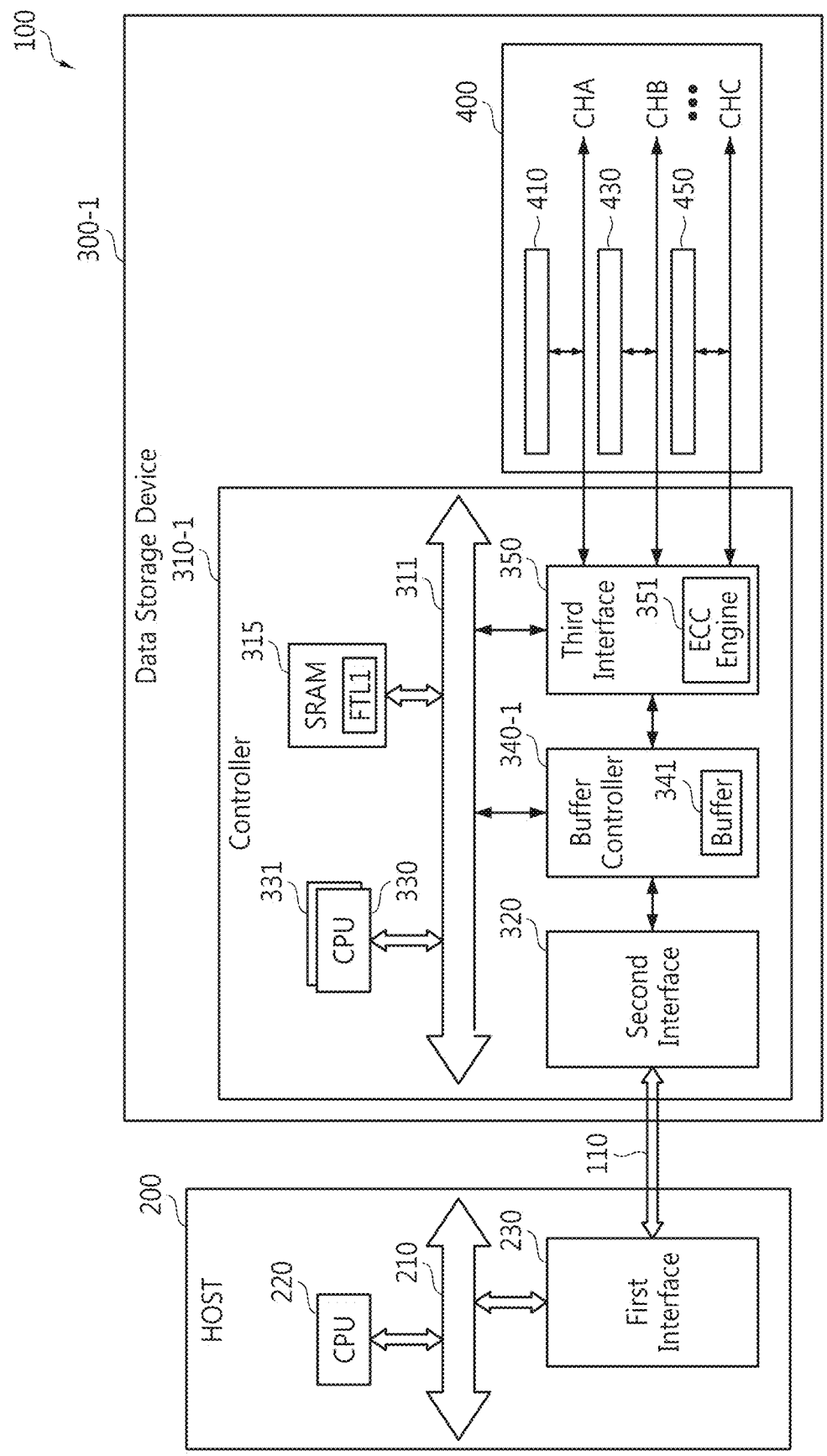
FIG. 14 is a block diagram of a data processing system according to still another example embodiment of inventive concepts.

FIG. 14 is a block diagram of a data processing system according to still another example embodiment.

Referring to FIG. 14, the data processing system 100 includes: the host 200 and a DRAM-less data storage device 300-1. In one example, the data processing system 100 may be embodied as a tablet PC, an eMMC, etc. The DRAM-less data storage device 300-1 includes a controller 310-1 and the memory cluster 400.

In the example embodiment shown in FIG. 14, the buffer controller 340-1 may not perform data processing on an external buffer. During write and/or read operations, the buffer controller 340-1 may transmit data to the second interface 320 or the third interface 350 using the internal buffer 341. Except for operation of the buffer controller 340-1, the structure and operation of a controller 310-1 of FIG. 14 is the same or substantially the same as the structure and operation of the controller 310 of FIG. 1. Accordingly, a further detailed description of the controller 310-1 is omitted. The memory cluster 400 may include example embodiments of scale-out devices described above with regard to one or more of FIGS. 2 to 12B.

Figure 15:
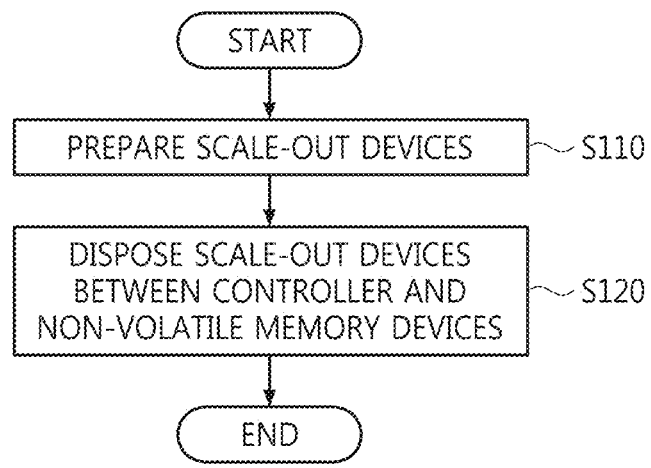
FIG. 15 is a flowchart illustrating a method of manufacturing the data storage device, according to an example embodiment of inventive concepts.

FIG. 15 is a flowchart illustrating a method of manufacturing a data storage device according to an example embodiment. The example embodiment shown in FIG. 15 will be described with regard to the example embodiments shown in FIGS. 1 through 14 where appropriate and/or applicable.

Referring to FIGS. 1 to 15, at S110 the scale-out devices are prepared. At S120, each of the scale-out devices 401 is disposed between the controller 310 or 310-1 and a plurality of non-volatile memory devices NAND to manufacture the data storage device 300 or 300-1.

Data storage devices having a scale-out structure according to one or more example embodiments of inventive concepts may more easily extend storage capacity without decreasing data processing speed. Data storage devices having a scale-out structure according to one or more example embodiments may support management software and/or management firmware for non-volatile memory devices included in the data storage device in a layered and/or distributed structure based on scalability. Accordingly, data storage devices having a scale-out structure, according to one or more example embodiments, may disperse and/or distribute software and/or firmware overhead for increased capacity.

While inventive concepts have been shown and described with reference to some example embodiments thereof, it will be understood that various changes in form and details may be made therein without departing from the spirit and scope of the following claims.

I claim:

1. A data storage device comprising:
   a first controller configured to communicate with an external host through a host interface;
   a plurality of memory modules connected with the first controller through a plurality of main channels, respectively; and
   a first buffer configured to temporarily store data transmitted from the external host or the plurality of memory modules,
   wherein each of the plurality of memory modules comprises:
      a second controller configured to communicate with the first controller through a corresponding one of the plurality of main channels;
      a plurality of first nonvolatile memory devices configured to communicate with the second controller through a plurality of first local channels;
      a second buffer configured to
         temporarily store data to be written to the plurality of first nonvolatile memory devices or data read from the plurality of first nonvolatile memory devices, and
         store a first table including mapping information between first logical addresses and first physical addresses of the plurality of first nonvolatile memory devices;
      a third controller configured to communicate with the first controller through the corresponding one of the plurality of main channels, through which the second controller communicates with the first controller;
      a plurality of second nonvolatile memory devices configured to communicate with the third controller through a plurality of second local channels; and
      a third buffer configured to
         temporarily store data to be written to the plurality of second nonvolatile memory devices or data read from the plurality of second nonvolatile memory devices, and
         store a second table including mapping information between second logical addresses and second physical addresses of the plurality of second nonvolatile memory devices.

2. The data storage device of claim 1, wherein a first group of the plurality of first nonvolatile memory devices is configured to communicate with the second controller through a corresponding one of the plurality of Sr t local channels,
   a second group of the plurality of first nonvolatile memory devices is configured to communicate with the second controller through a corresponding another of the plurality of first local channels.

3. The data storage device of claim 1, wherein the second controller and the second buffer are on a semiconductor substrate.

4. The data storage device of claim 3, wherein the second buffer comprises at least two DRAM (Dynamic Random Access Memory) devices configured to be stacked on the semiconductor substrate.

5. The data storage device of claim 3, wherein the second controller and the second buffer are embodied in the form of a package,
the package is one of a package on package (PoP), a multi-chip package (MCP), and a system-in-package (SiP).

6. The data storage device of claim 1, wherein the second controller is implemented in a first chip and the second buffer is implemented in a second chip, and
the second chip is stacked on the first chip using stack balls.

7. The data storage device of claim 1, wherein a first group of the plurality of second nonvolatile memory devices is configured to communicate with the third controller through the corresponding one of the plurality of second local channels, and
a second group of the plurality of second nonvolatile memory devices is configured to communicate with the third controller through a corresponding another of the plurality of second local channels.

8. The data storage device of claim 1, wherein the first buffer is further configured to store a global table including mapping information between the first and second logical addresses and identifiers of the plurality of memory modules.

9. The data storage device of claim 1, wherein the host interface is one of a serial advanced technology attachment (SATA) interface, a SATA express interface, a serial attached Small computer system interface (SCSI) interface, a peripheral component interconnect express (PCIe) interface, a non-volatile memory Express (NVMe) interface, and an advanced host controller interface (AHCI),
the plurality of main channels and the plurality of first local channels are based on a NAND-type flash interface.

10. A memory cluster comprising:
a first memory module configured to communicate with an external controller through a first main channel;
a second memory module configured to communicate with the external controller through the first main channel;
a third memory module configured to communicate with the external controller through a second main channel; and
a fourth memory module configured to communicate with the external controller through the second main channel,
wherein each of the first to fourth memory modules comprises:
a first controller configured to communicate with the external controller through a corresponding one of the first and second main channels;
a plurality of first nonvolatile memory devices configured to communicate with the first controller through a plurality of first local channels;
a first buffer configured to
temporarily store data to be written into the plurality of first nonvolatile memory devices or data read from the plurality of first nonvolatile memory devices, and
store a first table including mapping information between first logical addresses and first physical addresses of the plurality of first nonvolatile memory devices;
a second controller configured to communicate with the external controller through the corresponding one of the first and second main channels;
a plurality of second nonvolatile memory devices configured to communicate with the second controller through a plurality of second local channels; and
a second buffer configured to
temporarily store data to be written into the plurality of second nonvolatile memory devices or data read from the plurality of second nonvolatile memory devices, and
store a second table including mapping information between second logical addresses and second physical addresses of the plurality of second nonvolatile memory devices.

11. The memory cluster of claim 10, wherein
the first controller is implemented in a first chip and the first buffer is implemented in a second chip, the first chip and the second chip are embodied in the form of a first package,
the second controller is implemented in a third chip and the second buffer is implemented in a fourth chip, the third chip and the fourth chip are embodied in the form of a second package, and
each of the first and second package is one of a package on package (PoP), a multi-chip package (MCP), and a system-in-package (SiP).

12. A data storage device comprising:
a main controller configured to communicate with an external host device through a host interface;
a plurality of memory modules configured to communicate with the main controller through a main interface supporting an A-channels by B-ways, where each of A and B being a natural number greater than or equal to 2; and
a first buffer configured to
temporarily store data transmitted from the external host device or the plurality of memory modules, and
store a first table including mapping information between logical addresses and identifiers of a plurality of memory modules,
wherein each of the plurality of memory modules comprises:
a controller configured to communicate with the main controller through corresponding one of the A-channels;
a plurality of nonvolatile memory devices configured to communicate with the controller through a third interface supporting a C-channels by D-ways, where each of C and D is a natural number greater than or equal to 2,
wherein a number of the plurality of memory modules is A×B, and a number of the plurality of nonvolatile memory devices is C×D; and
a second buffer configured to
temporarily store data to be written in the plurality of nonvolatile memory devices or data read from the plurality of nonvolatile memory devices, and
store a second table including mapping information between corresponding subset of the logical addresses and physical addresses of the plurality of nonvolatile memory devices.

13. The data storage device of claim 12, wherein the controller and the second buffer are embodied in a first package, and
the first package is one of a package on package (PoP), a multi-chip package (MCP), and a system-in-package (SiP).

14. The data storage device of claim 12, wherein the main interface and the third interface are based on a NAND-type flash memory interface.

\* \* \* \* \*